United States Patent
Tang et al.

(10) Patent No.: US 11,212,853 B2
(45) Date of Patent: Dec. 28, 2021

(54) METHODS AND APPARATUS FOR CGI READING IN NR SYSTEM

(71) Applicant: MediaTek Singapore Pte. Ltd., Singapore (SG)

(72) Inventors: Zhixun Tang, Beijing (CN); Tsang-Wei Yu, Hsinchu (CN); Tao Chen, Beijing (CN); Chun-Fan Tsai, Hsinchu (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/962,617

(22) PCT Filed: Jul. 26, 2019

(86) PCT No.: PCT/CN2019/097893
§ 371 (c)(1),
(2) Date: Jul. 16, 2020

(87) PCT Pub. No.: WO2020/020340
PCT Pub. Date: Jan. 30, 2020

(65) Prior Publication Data
US 2020/0413460 A1    Dec. 31, 2020

(30) Foreign Application Priority Data
Jul. 26, 2018 (WO) ............... PCT/CN2018/097269

(51) Int. Cl.
*H04W 76/11* (2018.01)
*H04W 76/28* (2018.01)
(Continued)

(52) U.S. Cl.
CPC ........... *H04W 76/11* (2018.02); *H04L 1/1614* (2013.01); *H04W 36/0061* (2013.01);
(Continued)

(58) Field of Classification Search
CPC . H04W 76/11; H04W 76/28; H04W 36/0061; H04W 48/16; H04W 56/001;
(Continued)

(56) References Cited

U.S. PATENT DOCUMENTS

2019/0357126 A1* 11/2019 Marinier ............. H04W 56/001

FOREIGN PATENT DOCUMENTS

| CN | 101686528 A | 3/2010 |
|---|---|---|
| CN | 107592649 A | 1/2018 |

(Continued)

OTHER PUBLICATIONS

Combined Taiwanese Office Action and Search Report dated May 21, 2021 in Taiwanese Patent Application No. 109114746 (with English translation of Category of Cited Documents), 6 pages.
(Continued)

*Primary Examiner* — Diane D Mizrahi
(74) *Attorney, Agent, or Firm* — Oblon, McClelland, Maier & Neustadt, L.L.P.

(57) ABSTRACT

Aspects of the disclosure can provide a method and an apparatus for Cell Global Identifier (CGI) reading in a New Radio (NR) system. The method can include receiving a request over a serving cell to report Cell Global Identifier (CGI) information of a target cell to a network node, and decoding system information to acquire the CGI information of the target cell by using Synchronization Signal Block (SSB) and Remaining Minimum System Information (RMSI) occasions in Discontinuous Reception (DRX) off duration of the serving cell, using at least one autonomous gap in data reception and transmission of the serving cell, or using at least one specific gap to interrupt data reception and transmission in DRX on durations of the serving cell. Subsequently, the CGI information of the target cell can be transmitted to the network node.

20 Claims, 13 Drawing Sheets

(51) Int. Cl.
*H04L 1/16* (2006.01)
*H04W 36/00* (2009.01)
*H04W 48/16* (2009.01)
*H04W 56/00* (2009.01)

(52) U.S. Cl.
CPC ......... *H04W 48/16* (2013.01); *H04W 56/001* (2013.01); *H04W 76/28* (2018.02)

(58) Field of Classification Search
CPC ... H04L 1/1614; H04L 5/0098; H04L 5/0053; H04L 5/0005
See application file for complete search history.

(56) References Cited

FOREIGN PATENT DOCUMENTS

| | | |
|---|---|---|
| KR | 10-1742552 B1 | 5/2017 |
| KR | 10-2018-0082679 A | 7/2018 |
| WO | WO 2017/000591 A1 | 1/2017 |

OTHER PUBLICATIONS

International Search Report and Written Opinion dated Oct. 16, 2019 in PCT/CN2019/097893 filed on Jul. 26, 2019.

\* cited by examiner

US 11,212,853 B2

METHODS AND APPARATUS FOR CGI READING IN NR SYSTEM

INCORPORATION BY REFERENCE

This present disclosure claims the benefit of International Application No. PCT/CN2018/097269, filed on Jul. 26, 2018, which is incorporated herein by reference in its entirety.

TECHNICAL FIELD

The present disclosure relates to wireless communications, and specifically relates to the use of DRX (Discontinuous Reception) on Cell Global Identifier (CGI) reading in a New Radio (NR) system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The mobile communication system has grown exponentially over the years. The $3^{rd}$ generation partnership project (3GPP), which has developed the most successful standard technologies in mobile communication market, such as Universal Mobile Telecommunication System (UMTS) and Long Term Evolution (LTE), is currently carrying out the standardization of the fifth generation (5G) system (5GS).

Regarding measurements performed by a User Equipment (UE) in a New Radio (NR) network, a serving cell can request the UE to acquire Cell Global Identifier (CGI) of a target cell. The CGI can be used to identify a cell within a network. To acquire the CGI of a target cell, the UE can read at least part of the System Information (SI) of the target cell. The SI can include Master Information Block (MIB) and relevant System Information Block1 (SIB1).

One typical way to acquire the CGI of the target cell is to consider a "best effort" action of the UE that configures with discontinuous reception (DRX) operation during CONNECTED mode to acquire the CGI of the target cell.

Another solution is to use "autonomous gap". The UE can acquire the CGI of the target cell by reading the SI of the target cell during one or more gaps, which are autonomously created by the UE. An 'autonomous gap' can be a gap in data reception, a gap in data transmission, or a gap in both data reception and data transmission. The UE can create the autonomous gap(s) by itself.

The MIB information is transmitted with a periodicity of 80 millisecond (ms) and repetitions made within 80 ms. The MIB information is located in Synchronization Signal Block (SSB) which is configured with a SMTC (SSB Based RRM Measurement Timing Configuration) periodicity of {5, 10, 20, 40, 80, 160} ms.

The SIB1 information is included in Remaining Minimum System Information (RMSI) control resource set (CORSET) and is repeatedly transmitted within one Transmission Time Interval (TTI) which equals to 160 ms. The default periodicity of SIB1 is 20 ms but the actual periodicity is up to network implementation.

In CONNECTED mode, the UE generally use DRX technique to reduce power consumption. UE periodically goes into sleep mode and wakes up in each DRX on duration. Basically, DRX cycle is one of the values among {10, 20, 32, 40, 64, 80, 128, 160, 256, 320, 512, 640, 1024, 1280, 2048, 2560} ms.

In Long Term Evolution (LTE), wherein the UE can configure the DRX based CGI reading to acquire the CGI information of the target cell, the UE can always have the opportunity to decode the MIB and SIB1 during DRX operation. But in the NR network, when the SSB and RMSI occasions fully overlap with DRX on durations, the UE cannot acquire the CGI information of the target cell when the UE performs the DRX based CGI reading. When the SSB and RMSI occasions partially overlap or do not overlap with the DRX on durations, the CGI reading behaviors can also be different. Accordingly, it is important to properly schedule DRX based CGI reading according to the aforementioned circumstances.

SUMMARY

Aspects of the disclosure provide a method for Cell Global Identifier (CGI) reading in a New Radio (NR) system. The method can include receiving a request over a serving cell to report CGI information of a target cell to a network node, and decoding system information to acquire the CGI information of the target cell by using Synchronization Signal Block (SSB) and Remaining Minimum System Information (RMSI) occasions in Discontinuous Reception (DRX) off durations of the serving cell, or using at least one autonomous gap in data reception and transmission of the serving cell for acquiring CGI, or using at least one specific gap to interrupt data reception and transmission in DRX on durations of the serving cell for acquiring CGI. The CGI information of the target cell can then be transmitted to the network node.

In an embodiment, when the SSB and RMSI occasions of the target cell fully overlap with the DRX on durations of the serving cell, the method can further include receiving a message that indicates the use of the DRX based CGI reading, receiving the configuration with modifying at least one of the DRX on duration periodicity and/or DRX offset value of the serving cell to avoid the overlaps with the SSB and RMSI occasions of the target cell, or the SSB based RRM Measurement Timing Configuration (SMTC) periodicity, and/or SMTC offset value, RMSI periodicity and/or RMSI offset value of the target cell to avoid the overlaps with the DRX on durations of the serving cell, decoding Master Information Block (MIB) and the RMSI in the modified SSB and RMSI occasions of the target cell during the modified DRX off durations of the serving cell, and acquiring the CGI information of the target cell from the decoded MIB and the RMSI.

In another embodiment, when the SSB and RMSI occasions of the target cell partially overlap with the DRX on durations of the serving cell, the method can further include receiving a message that indicates the use of the DRX based CGI reading, receiving a CGI reading timer based on frequency range (FR) information, DRX information, SMTC information, RMSI configuration information, and the overlap condition between the DRX on durations and the SSB and RMSI occasions, decoding MIB and the RMSI in the SSB and RMSI occasions of the target cell during the modified DRX off durations of the serving cell until the CGI reading timer expires, and acquiring the CGI information of the target cell from the decoded MIB and the RMSI.

In an embodiment, decoding the system information to acquire the CGI information of the target cell by using at least one autonomous gap in data reception and transmission of the serving cell, can further include receiving a message that indicates the use of the autonomous gap based CGI reading, creating the autonomous gap in at least one of data reception and data transmission of the serving cell, interrupting at least one of data reception and data transmission of the serving cell by the created autonomous gap, decoding MIB and the RMSI in the SSB and RMSI occasions of the target cell during the created autonomous gap, and acquiring the CGI information of the target cell from the decoded MIB and RMSI.

In another embodiment, decoding the system information to acquire the CGI information of the target cell by configuring at least one specific gap to interrupt data reception and transmission of the serving cell, can further include receiving a message that indicates the use of the specific gap based CGI reading, receiving the specific gap configuration based on the gap periodicity, offset value, and gap duration of the specific gap, interrupting at least one of data reception and data transmission during the DRX on duration of the serving cell by the created specific gap, decoding the MIB and RMSI during the created specific gap, and acquiring the CGI information of the target cell from the decoded MIB and RMSI.

In an embodiment, when creating the specific gap based on the gap periodicity, offset value, and gap duration of the specific gap, the method can further include one of creating the specific gap periodicity, offset value, and duration, generating a bitmap that includes a plurality of bits to indicate the number of DRX cycles for the specific gap periodicity and offset value for the CGI reading starting position, setting a CGI reading start offset and a gap duration, and configuring a gap sharing percentage between the DRX on durations and the SSB and RMSI occasions for the CGI reading.

In another embodiment, when decoding the system information to acquire the CGI information of the target cell, the method can further include providing assistant information for decoding the RMSI by generating a bitmap to indicate the RMSI position in one Transmission Time Interval (TTI), creating a periodicity and a offset value to indicate the RMSI position in one TTI, using a specific gap periodicity, offset value, and gap duration to indicate the RMSI position, generating a bitmap that includes a plurality of bits to indicate the number of DRX cycles for the specific gap periodicity and offset value for the RMSI starting position, and configuring a gap sharing percentage between the DRX on durations and the RMSI occasions for the RMSI decoding.

Aspects of the disclosure can further provide an apparatus for CGI reading. The apparatus can have processing circuitry, which is configured to receive a request over a serving cell to report CGI information of a target cell to a network node, decode system information to acquire the CGI information of the target cell by using SSB and RMSI occasions in DRX off duration of the serving cell, or using at least one autonomous gap in data reception and transmission of the serving cell for acquiring the CGI information, or using at least one specific gap to interrupt data reception and transmission in DRX on durations of the serving cell for acquiring the CGI information, and transmit the CGI information of the target cell to the network node.

Aspects of the disclosure can further provide a non-transitory computer readable medium storing instructions which, when executed by a processor, cause the processor to perform the steps of receiving a request over a serving cell to report CGI information of a target cell to a network node, decoding system information to acquire the CGI information of the target cell by using SSB and RMSI occasions in DRX off durations of the serving cell, or using at least one autonomous gap in data reception and transmission of the serving cell for acquiring the CGI information, or using at least one specific gap to interrupt data reception and transmission in DRX on durations of the serving cell for acquiring the CGI information, and transmitting the CGI information of the target cell to the network node.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure provide method and apparatus for Cell Global Identifier (CGI) reading in a New Radio (NR) system. In the NR network, when the Synchronization Signal Block (SSB) and Remaining Minimum System Information (RMSI) occasions fully overlap with the Discontinuous Reception (DRX) on durations, user equipment (UE) cannot acquire the CGI information when the UE uses the DRX based CGI reading. When the SSB and RMSI occasions partially overlap with DRX on durations, the CGI reading behaviors are also different. Accordingly, it is important for the network to properly schedule DRX based CGI reading in different scenarios. The method can include receiving a request over a serving cell to report CGI information of a target cell to a network node, and decoding system information to acquire the CGI information of the target cell by using SSB and RMSI occasions in DRX off duration of the serving cell, using at least one autonomous gap in data reception and transmission of the serving cell, or using at least one specific gap to interrupt data reception and transmission in DRX on durations of the serving cell. The CGI information of the target cell can then be transmitted to the network node.

Figure 1:
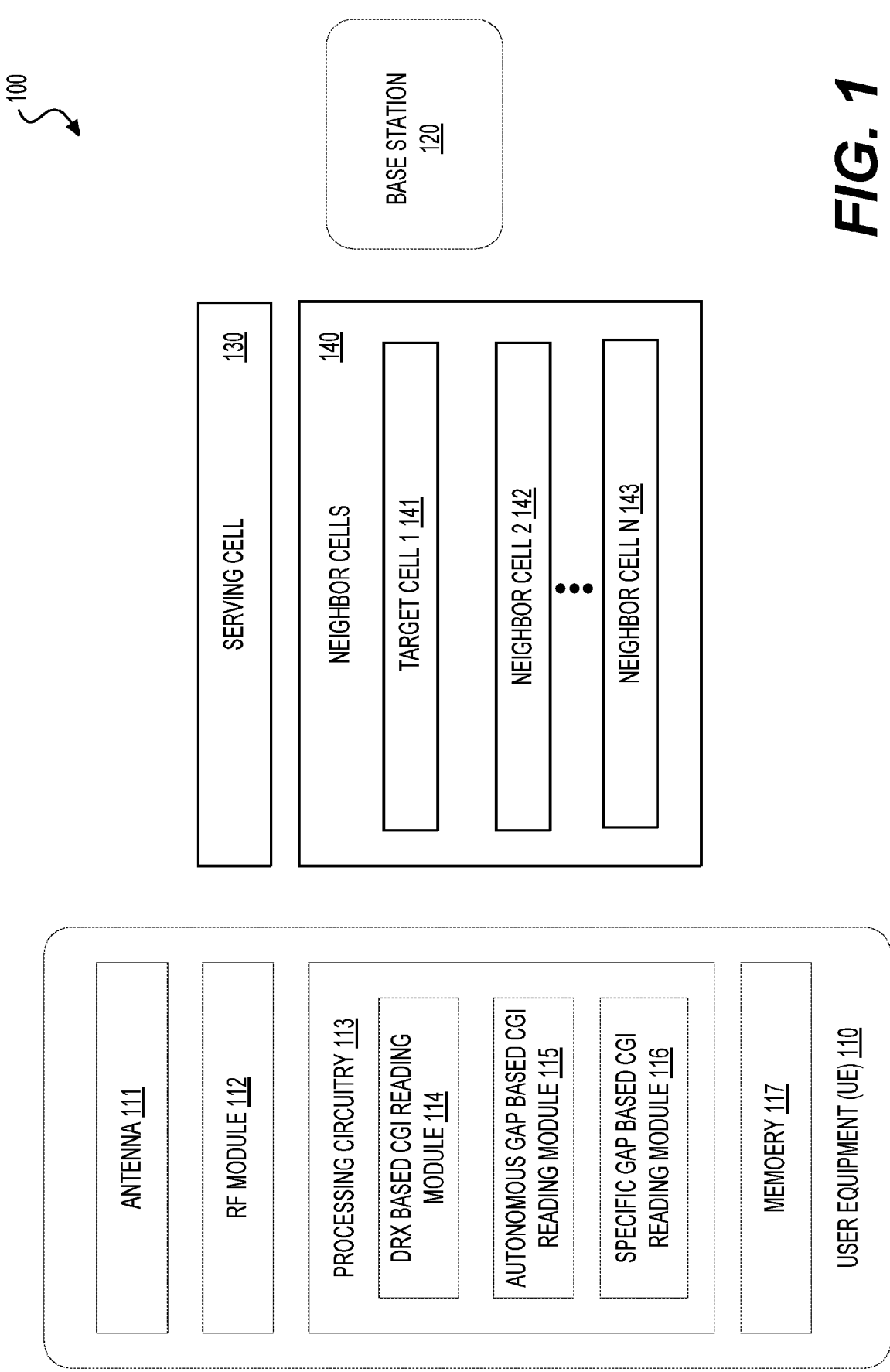
FIG. 1 shows an exemplary wireless communication system according to an embodiment of the disclosure.

FIG. 1 shows an exemplary wireless communication system 100 according to an embodiment of the disclosure. As shown, the wireless communication system 100 can include a UE 110 and a base station (BS) 120. The wireless communication system 100 can be any communication system wherein the UE 110 and the BS 120 can communicate with each other wirelessly. The technologies deployed between the UE 110 and the BS 120 in the wireless communication system 100 can include, but are not limited to, Fifth Generation (5G) NR, Long Term Evolution (LTE), Wi-Fi, and the like. In the FIG. 1 example, the wireless communication system 100 can be a NR network that employs the 5G NR technologies and the LTE technologies which are developed by the $3^{rd}$ Generation Partnership Project (3GPP) for wireless communications between the UE 110 and the BS 120.

The UE 110 can be any apparatus or network element in the wireless communication system 100 capable of signal transmission and reception. For example, the UE 110 can be a mobile phone, a laptop computer, a tablet, a vehicle carried mobile communication device, a utility meter fixed at a certain location, a commercial product with wireless communication capability and the like. While only one UE 110 is depicted in the FIG. 1, it should be understood that any number of UEs 110 can be distributed in the wireless communication system 100.

In the FIG. 1 example, the UE 110 can include an antenna 111, a radio frequency (RF) module 112, a processing circuitry 113, and a memory 117. The antenna 111 can include one or more antenna arrays. The processing circuitry 113 can further include a DRX based CGI reading module 114, an autonomous gap based CGI reading module 115, and a specific gap based CGI reading module 116. The memory 117 can be any device or material that can place, keep, and retrieve electronic data, such as operating systems, program instructions, and the like. It can include a read only memory (ROM), a random access memory (RAM), a flash memory, a solid state memory, a hard disk drive, an optical disk drive, and the like.

Within the processing circuitry 113, the DRX based CGI reading module 114 can implement the CGI reading according to DRX operations. Specifically, when the SSB (or RMSI) occasions of the target cell 141 fully overlap with the DRX on durations of the serving cell 130, the DRX based CGI reading module 114 can execute the program instructions stored in the memory 117 to receive a modified DRX on duration periodicity and the DRX offset values of the serving cell 130 to avoid the overlaps with the SSB and RMSI occasions of the target cell 141. Alternatively, the DRX based CGI reading module 114 can also execute the program instructions stored in the memory 117 to receive a modified SSB Based RRM Measurement Timing Configuration (SMTC) periodicity and the SMTC offset value of the target cell 141 to avoid the overlaps of the SSB occasions with the DRX on durations of the serving cell 130, or modify the RMSI periodicity and the RMSI offset value of the target cell 141 to avoid the overlaps of the RMSI occasions with the DRX on durations of the serving cell 130. Further, the DRX based CGI reading module 114 can execute the program instructions stored in the memory 117 to decode Master Information Block (MIB) in the SSB occasions of the target cell 141 during the DRX off durations of the serving cell 130 and then decode System Information Block1 (SIB1) in the RMSI occasions of the target cell 141 during the DRX off durations of the serving cell 130. Based on the decoded MIB and SIB1, the UE 110 can acquire the CGI information of the target cell 141. Further, the processing circuitry 113 can execute the program instructions stored in the memory 117 to report the CGI to the BS 120.

When the SSB (or RMSI) occasions of the target cell 141 partially overlap with the DRX on durations of the serving cell 130, some SSB (or RMSI) occasions are overlapped with the DRX on durations and others are not. The DRX based CGI reading module 114 can execute the program instructions stored in the memory 117 to extend the measurement time for CGI reading based on a configured CGI reading timer, which is equivalent to increase the number of available SSB and RMSI occasions that are not overlapped with the DRX on durations, so that the UE 110 can have enough time to decode the MIB and SIB1 in the SSB and RMSI occasions during the DRX off durations of the serving cell 130, respectively. Herein, the CGI reading timer information can depend on frequency range (FR), DRX configuration information, SMTC information, RMSI information, and/or the overlap situation between the DRX on durations and the SSB (or RMSI) occasions. Further, the DRX based CGI reading module 114 can execute the program instructions stored in the memory 117 to decode the MIB in the SSB occasions of the target cell 141 during the DRX off durations of the serving cell 130 and then decode the SIB1 in the RMSI occasions of the target cell 141 during the DRX off durations of the serving cell 130. Based on the decoded MIB and SIB1, the UE 110 can acquire the CGI information of the target cell 141. At last, the processing circuitry 113 can execute the program instructions stored in the memory 117 to report the CGI information to the BS 120.

The autonomous gap based CGI reading module 115 can execute the program instructions stored in the memory 117 to create one or more gaps in data reception and data transmission of the serving cell 130. Further, the autonomous gap based CGI reading module 115 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. At last, the processing circuitry 113 can execute the program instructions stored in the memory 117 to report the CGI information to the BS 120.

The specific gap based CGI reading module 116 can execute the program instructions stored in the memory 117 to interrupt the data reception and data transmission in the DRX on durations of the serving cell 130 based on the configured specific gaps. Further, the specific gap based CGI reading module 116 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. At last, the processing circuitry 113 can execute the program instructions stored in the memory 117 to report the CGI information to the BS 120.

It should be understood that the processing circuitry 113 of the UE 110 can include any other modules which can implement any other functionalities by executing the program instructions stored in the memory 117.

The BS 120 is a radio station which is located in an access network (AN) as part of the wireless communication system 100. The BS 120 can implement one or more access technologies to communicate with the UE 110 and provide connections between the UE 110 and a core networks (CN) of the wireless communication system 100. In the present disclosure, the BS 120 can be a network node in the NR network, as an implementation of a Next Generation NodeB (gNB) that is specified in the 3GPP 5G NR standards.

In operation, the UE 110 can camp on the serving cell 130 in a CONNECTED mode based on cell search. At the same time, several neighbor cell(s) 140 can be configured between the UE 110 and the BS 120. The UE 110 can measure the neighbor cell(s) 140 to decide whether to handover to one of the neighbor cell(s) 140 for better quality or continue to stay of the serving cell 130. In some examples, the neighbor cell(s) 140 can include multiple cells 141-143. In some other examples, there can be only one neighbor cell 140. When the UE 110 receives the measurement command message from the BS 120, it can also receive a report configuration with the purpose to report the CGI information of the target cell 141. For example, the UE 110 can receive a signaling "reportCGI" message from the BS 120 and the signaling "reportCGI" message can include {si-RequestForHO, gap periodicity, offset, and duration}. When the element "si-RequestForHO" is set to false (e.g., 0), the UE 110 can use the DRX based CGI reading to acquire the CGI information of the target cell 141. When the element "si-RequestForHO" is set to true (e.g., 1), the UE 110 can use the autonomous gap based CGI reading to acquire the CGI information of the target cell 141. When the signaling "reportCGI" message have valid values for the elements of "gap periodicity, offset, and duration", the UE 110 can use the specific gap based CGI reading to acquire the CGI information of the target cell 141, regardless of the element "si-RequestForHO".

In an embodiment, when the SSB (or RMSI) occasions of the target cell 141 fully overlap with the DRX on durations of the serving cell 130 and the UE 110 is notified by the BS 120 to use the DRX based CGI reading to acquire the CGI information of the target cell 141, e.g., the element "si-RequestForHO" is set to false (e.g., 0), the processing circuitry 113 of the UE 110 can trigger the DRX based CGI reading module 114 to execute the program instructions stored in the memory 117 based on the modified configured DRX on duration periodicity (e.g., DRX cycle) and the DRX offset value of the servicing cell 130, so that the modified DRX on durations can avoid the overlaps with the SSB and RMSI occasions of the target cell 141. Alternatively, the DRX based CGI reading module 114 can also execute the program instructions stored in the memory 117 based on the updated SMTC periodicity and the SMTC offset value of the target cell 141 to avoid the overlaps of the SSB occasions with the DRX on durations of the serving cell 130, or modify the RMSI periodicity and the RMSI offset value of the target cell 141 to avoid the overlaps of the RMSI occasions with the DRX on durations of the serving cell 130. Further, the DRX based CGI reading module 114 can execute the program instructions stored in the memory 117 to decode the MIB in the SSB occasions of the target cell 141 during the DRX off durations of the serving cell 130 and then decode the SIB1 in the RMSI occasions of the target cell 141 during the DRX off durations of the serving cell 130. Based on the decoded MIB and SIB1, the UE 110 can acquire the CGI information of the target cell 141. At last, the DRX based CGI reading module 114 can execute the program instructions stored in the memory 117 to report the CGI information to the BS 120. Specifically, the RF module 112 can convert the acquired CGI information into analog signals and transmit the analog signals via the antenna 111 as wireless signals.

In an alternative embodiment, when the SSB (or RMSI) occasions of the target cell 141 partially overlap with the DRX on durations of the serving cell 130 and the UE 110 is notified by the BS 120 to use the DRX based CGI reading to acquire the CGI information of the target cell 141, e.g., the element "si-RequestForHO" is set to false (e.g., 0), the processing circuitry 113 of the UE 110 can trigger the DRX based CGI reading module 114 to execute the program instructions stored in the memory 117 based on the configured CGI reading timer, wherein the CGI reading timer information can depend on frequency range (FR), DRX configuration information, SMTC information, RMSI information, and the overlap situation between the DRX on durations and the SSB (or RMSI) occasions. The CGI reading timer can extend the measurement time for CGI reading, which is equivalent to increase the number of available SSB and RMSI occasions that are not overlapped with the DRX on durations, so that the UE 110 can have enough time to decode the MIB and SIB1 in the SSB and RMSI occasions during the DRX off durations of the serving cell 130, respectively. Further, the DRX based CGI reading module 114 can execute the program instructions stored in the memory 117 to decode the MIB in the SSB occasions of the target cell 141 during the DRX off durations of the serving cell 130 and then decode the SIB1 in the RMSI occasions of the target cell 141 during the DRX off durations of the serving cell 130. Based on the decoded MIB and SIB1, the UE 110 can acquire the CGI information of the target cell 141. At last, the DRX based CGI reading module 114 can execute the program instructions stored in the memory 117 to report the CGI information to the BS 120. Specifically, the RF module 112 can convert the acquired CGI information into analog signals and transmit the analog signals via the antenna 111 as wireless signals.

In an embodiment, when the UE 110 is notified by the BS 120 to use the autonomous gap based CGI reading to acquire the CGI information of the target cell 141, e.g., the element "si-RequestForHO" is set to true (e.g., 1), the processing circuitry 113 of the UE 110 can trigger the autonomous gap based CGI reading module 115 to execute the program instructions stored in the memory 117 to create one or more measurement gaps in data reception and data transmission of the serving cell 130. Further, the autonomous gap based CGI reading module 115 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. At last, the autonomous gap based CGI reading module 115 can execute the program instructions stored in the memory 117 to report the CGI information to the BS 120. Specifically, the RF module 112 can convert the acquired CGI information into analog signals and transmit the analog signals via the antenna 111 as wireless signals.

In another embodiment, when the UE 110 is notified by the BS 120 to use the specific gap based CGI reading to acquire the CGI information of the target cell 141, e.g., elements of "gap periodicity, offset, and duration" are set to valid values, the processing circuitry 113 of the UE 110 can trigger the specific gap based CGI reading module 116 to execute the program instructions stored in the memory 117 based on the configured one or more specific gaps to interrupt the data reception and data transmission in the DRX on durations of the serving cell 130. Further, the specific gap based CGI reading module 116 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. At last, the specific gap based CGI reading module 116 can execute the program instructions stored in the memory 117 to report the CGI information to the BS 120. Specifically, the RF module 112 can convert the acquired CGI information into analog signals and transmit the analog signals via the antenna 111 as wireless signals. Please note that the modules mentioned in FIG. 1 embodiment can be implemented by software, hardware or a combination of them.

Figure 2:
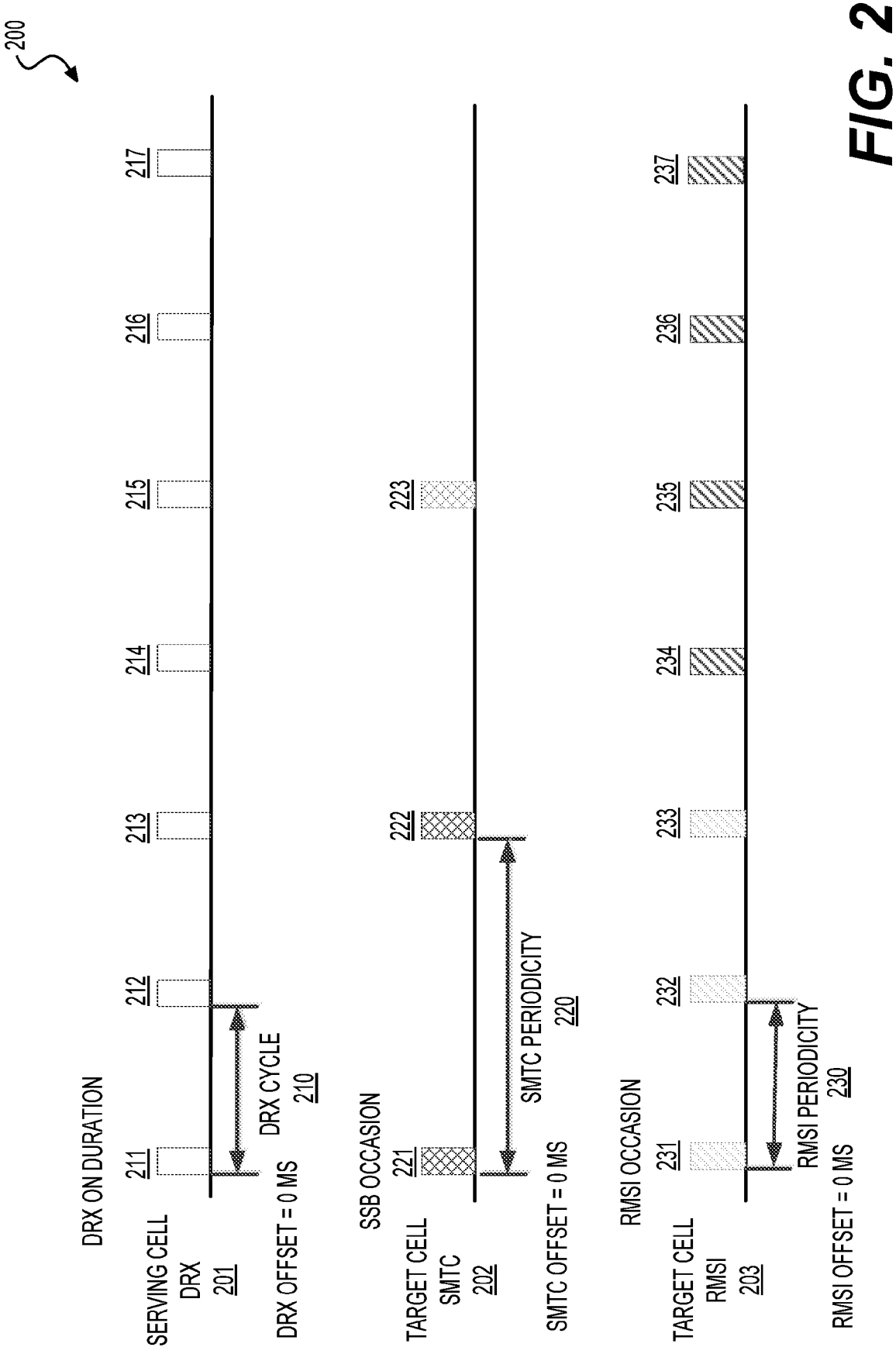
FIG. 2 shows an exemplary time diagram that illustrates the SSB (or RMSI) occasions of the target cell being fully overlapped with the DRX on durations of the serving cell according to an embodiment of the disclosure.

FIG. 2 is an exemplary time diagram 200 that illustrates the SSB (or RMSI) occasions of the target cell being fully overlapped with the DRX on durations of the serving cell according to an embodiment of the disclosure. In the FIG. 2 example, the offset values of the DRX 201 of the serving cell, the SSB occasions (i.e., SMTC) 202 of the target cell, and the RMSI occasions 203 of the target cell can be set to 0, respectively. The UE can periodically switch into a sleep mode and wake up in each DRX on duration 211-217. The DRX on duration periodicity (e.g., DRX cycle) 210 can be selected from one of the values among {10, 20, 32, 40, 64, 80, 128, 160, 256, 320, 512, 640, 1024, 1280, 2048, 2560} millisecond (ms). The UE can periodically decode the MIB information on each SSB occasions 221-223. Herein, the SSB Based RRM Measurement Timing Configuration (SMTC) periodicity 220 can be selected from one of the values among {5, 10, 20, 40, 80, 160} ms. Further, based on the decoded MIB information, the UE can periodically decode the SIB1 information which is included in RMSI Control Resource Set (CORSET), e.g., RMSI occasions 231-237. Herein, the default RMSI periodicity is set to 20 ms but the actual periodicity can be configured by the BS. The UE starts decoding the SIB1 information (i.e., RMSI decoding) after the UE finishes decoding the MIB information (i.e., MIB decoding). For example, as shown in the FIG. 2, the UE can perform the MIB decoding on SSB occasions 221 and 222, and then the UE can perform the RMSI decoding in the RMSI occasions 234-237.

In an embodiment, the SMTC (or RMSI) periodicity equals N multiplied with the DRX cycle (N>=1) and the DRX offset also equals to SMTC (or RMSI) offset. The UE cannot decode MIB (or RMSI) for target cell CGI reading with missing downlink (DL) transmission from its serving cell. For example, the DRX cycle 210 can be set to 20 ms. The SMTC periodicity 220 can be set to 40 ms, and the RMSI periodicity 230 can be set to 20 ms. The UE cannot perform MIB decoding and RMSI decoding because the SSB occasions 221-223 and the RMSI occasions 231-237 of the target cell are fully overlapped with the DRX on durations 211-217 of the serving cell. Under this circumstance, decoding the MIB information in the SSB occasions 221-222 and decoding the SIB1 information in the RMSI occasions 234-237 can fully collide with the data reception and data transmission in the DRX on durations 211-217.

Figure 3:
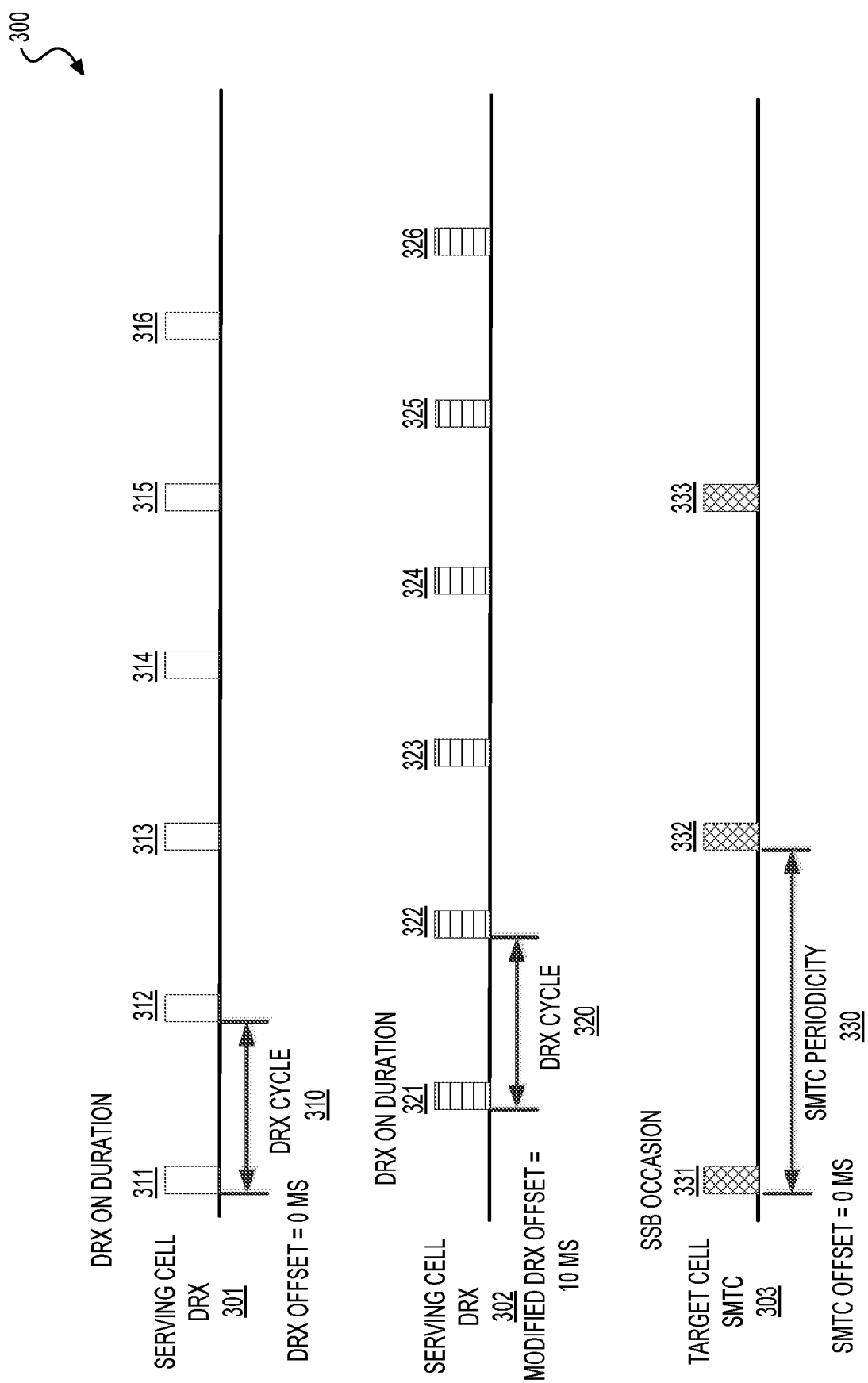
FIG. 3 shows an exemplary time diagram that illustrates a modified DRX configuration when the SSB (or RMSI) occasions of the target cell fully overlap with the DRX on durations of the serving cell according to an embodiment of the disclosure.

FIG. 3 is an exemplary time diagram 300 that illustrates a modified DRX configuration when the SSB (or RMSI) occasions of the target cell fully overlap with the DRX on durations of the serving cell according to an embodiment of the disclosure. In the FIG. 3 example, the offset value of the DRX can be modified to avoid the overlaps between the SSB (or RMSI) occasions of the target cell and the DRX on durations of the serving cell. It should be understood that the offset values of the SSB occasions (i.e., SMTC) and the RMSI occasions of the target cell can also be modified to avoid the overlaps with the DRX on durations of the serving cell.

In an embodiment, the DRX cycle of the serving cell 310 can be set to 20 ms and the SMTC periodicity of the target cell 330 can be set to 40 ms. The offset values of both the DRX 301 of the serving cell and the SSB occasions (i.e., SMTC) 303 of the target cell can be set to 0 ms. As shown in the FIG. 3, the SSB occasions 331-333 are fully overlapped with the DRX on durations 311, 313, and 315. Under this circumstance, the UE cannot decode the MIB information in the SSB occasions 331-333. Further, the DRX of the serving cell 301 can be reconfigured by modifying the DRX offset value from 0 ms to 10 ms. The modified DRX of the serving cell 302 can have the same DRX on duration periodicity (e.g., DRX cycle) 320, which is set to 20 ms. As shown in the FIG. 3, the positions of the SSB occasions 331-333 of the target cell are located in the DRX off durations of the serving cell, which further avoid the overlaps with the modified DRX on durations 321-325. Therefore, the UE can decode the MIB information in the SSB occasions 331-333 during the DRX off durations.

Figure 4:
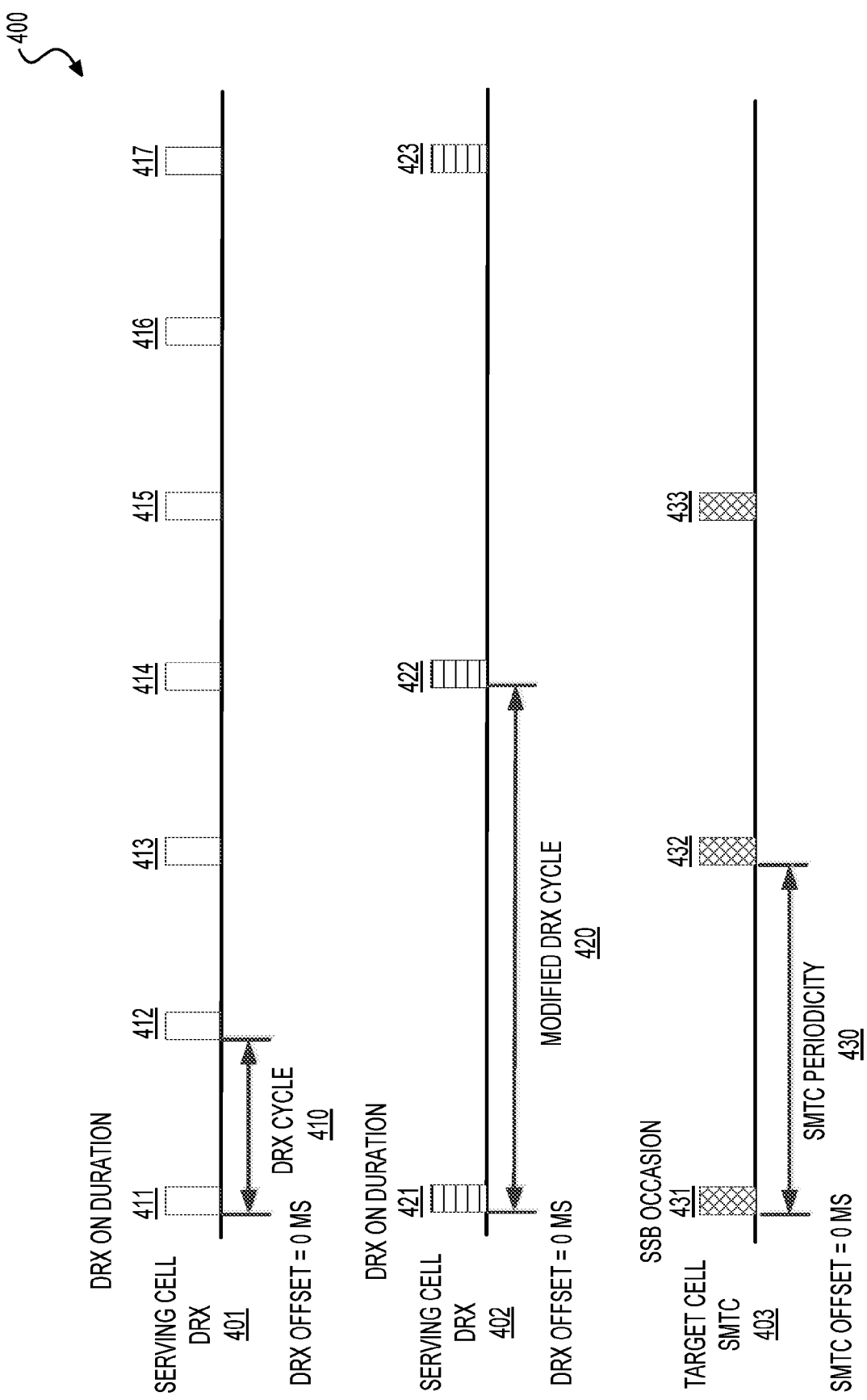
FIG. 4 shows another exemplary time diagram that illustrates a modified DRX configuration when the SSB (or RMSI) occasions of the target cell fully overlap with the DRX on durations of the serving cell according to an embodiment of the disclosure.

FIG. 4 is another exemplary time diagram 400 that illustrates a modified DRX configuration when the SSB (or RMSI) occasions of the target cell fully overlap with the DRX on durations of the serving cell according to an embodiment of the disclosure. In the FIG. 4 example, the DRX on duration periodicity (e.g., DRX cycle) can be modified to avoid the overlaps between the SSB (or RMSI) occasions of the target cell and the DRX on durations of the serving cell. It should be understood that the SMTC periodicity and the RMSI periodicity of the target cell can also be modified to avoid the overlaps with the DRX on durations of the serving cell.

In an embodiment, the DRX cycle of the serving cell 410 can be set to 20 ms and the SMTC periodicity of the target cell 430 can be set to 40 ms. The offset values of both the DRX 401 of the serving cell and the SSB occasions (i.e., SMTC) 403 of the target cell can be set to 0 ms. As shown in the FIG. 4, the SSB occasions 431-433 are fully overlapped with the DRX on durations 411, 413, and 415. Under this circumstance, the UE cannot decode the MIB information in the SSB occasions 431-433. Further, the DRX cycle of the serving cell 401 can be modifying from 20 ms to 64 ms, but the offset value of the modified DRX cycle of the serving cell 402 can remain the same (e.g., 0 ms). As shown in the FIG. 4, the SSB occasions 403 of the target cell is partially overlapped with the DRX 402 of the serving cell. For example, the SSB occasion 431 is fully overlapped with the DRX on duration 421, but the positions of the SSB occasions 432 and 433 of the target cell are located in the DRX off durations of the serving cell, which further avoid the overlaps with the modified DRX on durations 422 and 423. Therefore, the UE can decode the MIB information in the SSB occasions 432 and 433 during the DRX off durations.

In some other embodiments, both the periodicity and the offset value of the DRX of the serving cell can be modified together to avoid the DRX on durations being overlapped with the SSB (or RMSI) occasions of the target cell.

Figure 5:
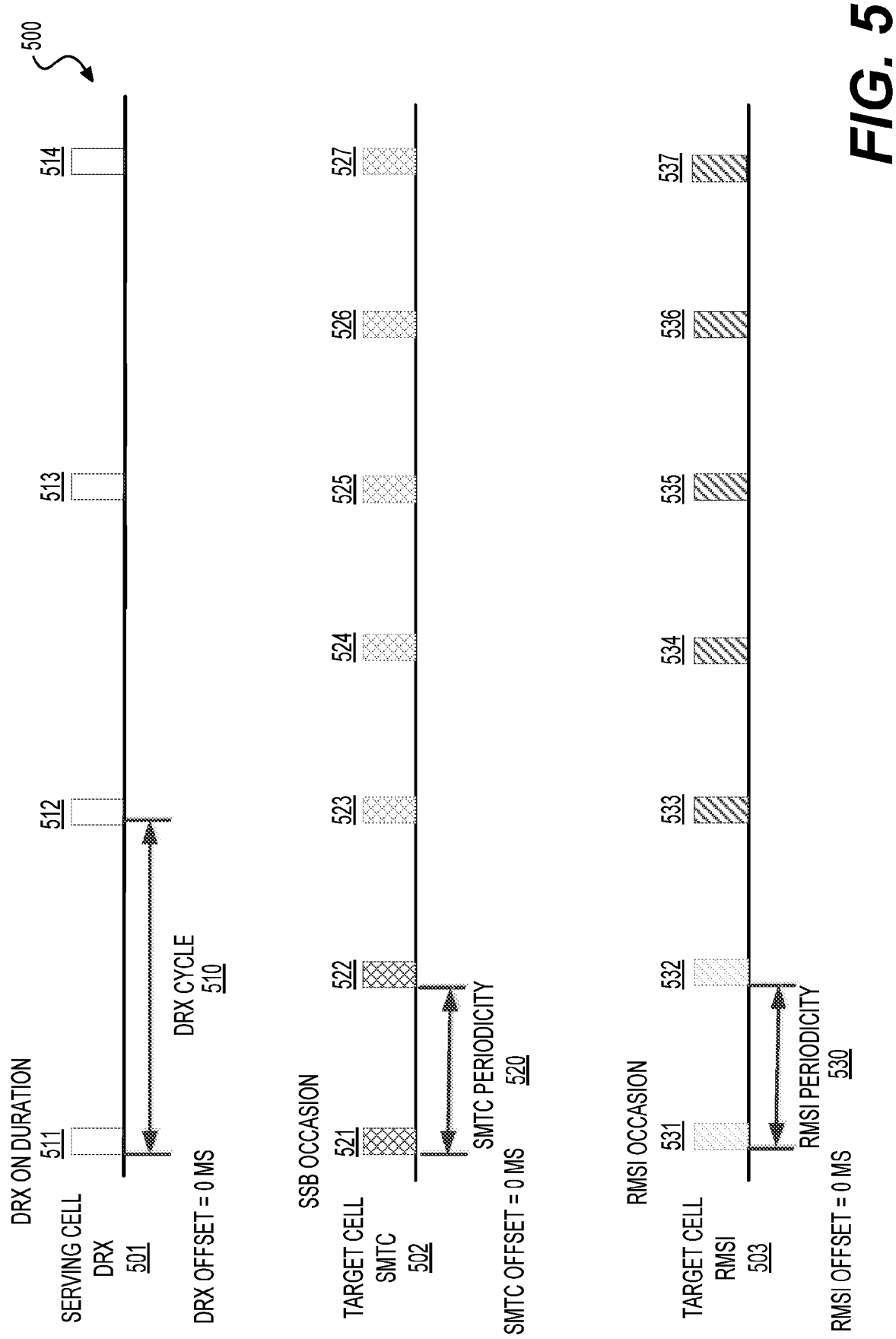
FIG. 5 shows an exemplary time diagram that illustrates the SSB (or RMSI) occasions of the target cell being partially overlapped with the DRX on durations of the serving cell according to an embodiment of the disclosure.

FIG. 5 is an exemplary time diagram 500 that illustrates the SSB (or RMSI) occasions of the target cell being partially overlapped with the DRX on durations of the serving cell according to an embodiment of the disclosure. In the FIG. 5 example, the offset values of the DRX 501 of the serving cell, the SSB occasions (i.e., SMTC) 502 of the target cell, and the RMSI occasions 503 of the target cell can be set to 0, respectively. The UE can periodically switch into a sleep mode and wake up on each DRX on duration 511-517. The DRX cycle 510 can be selected from one of the values among {10, 20, 32, 40, 64, 80, 128, 160, 256, 320, 512, 640, 1024, 1280, 2048, 2560} ms. The UE can periodically decode the MIB information on each SSB occasions 521-527. Herein, the SMTC periodicity 520 can be selected from one of the values among {5, 10, 20, 40, 80, 160} ms. Further, based on the decoded MIB information, the UE can periodically decode the SIB1 information which is included in the RMSI CORSET, e.g., RMSI occasions 531-537. Herein, the default RMSI periodicity can be set to 20 ms but the actual periodicity can be configured by the BS. The UE can start decoding the SIB1 information (i.e., RMSI decoding) after finishing the MIB decoding. For example, as shown in the FIG. 5, under non-overlap circumstance, the UE can perform the MIB decoding on SSB occasions 521 and 522, and then the UE can perform the RMSI decoding in RMSI occasions 533-537.

In an embodiment, the DRX cycle 510 can be set to 40 ms. The SMTC periodicity 520 and the RMSI periodicity 530 cam be set to 20 ms. The UE can perform MIB decoding on SSB occasion 522 and RMSI decoding in RMSI occasions 534 and 536 because the SSB occasions 521-527 and the RMSI occasions 531-537 of the target cell are partially overlapped with the DRX on durations 511-517 of the serving cell. Under this circumstance, decoding the MIB information in the SSB occasion 521 and decoding the SIB1 information in the RMSI occasions 533, 535, and 537 can collide with the data reception and data transmission in the DRX on durations 511-514. The numbers of available SSB occasions and the RMSI occasions can be less than the numbers in non-overlap circumstance.

Figure 6:
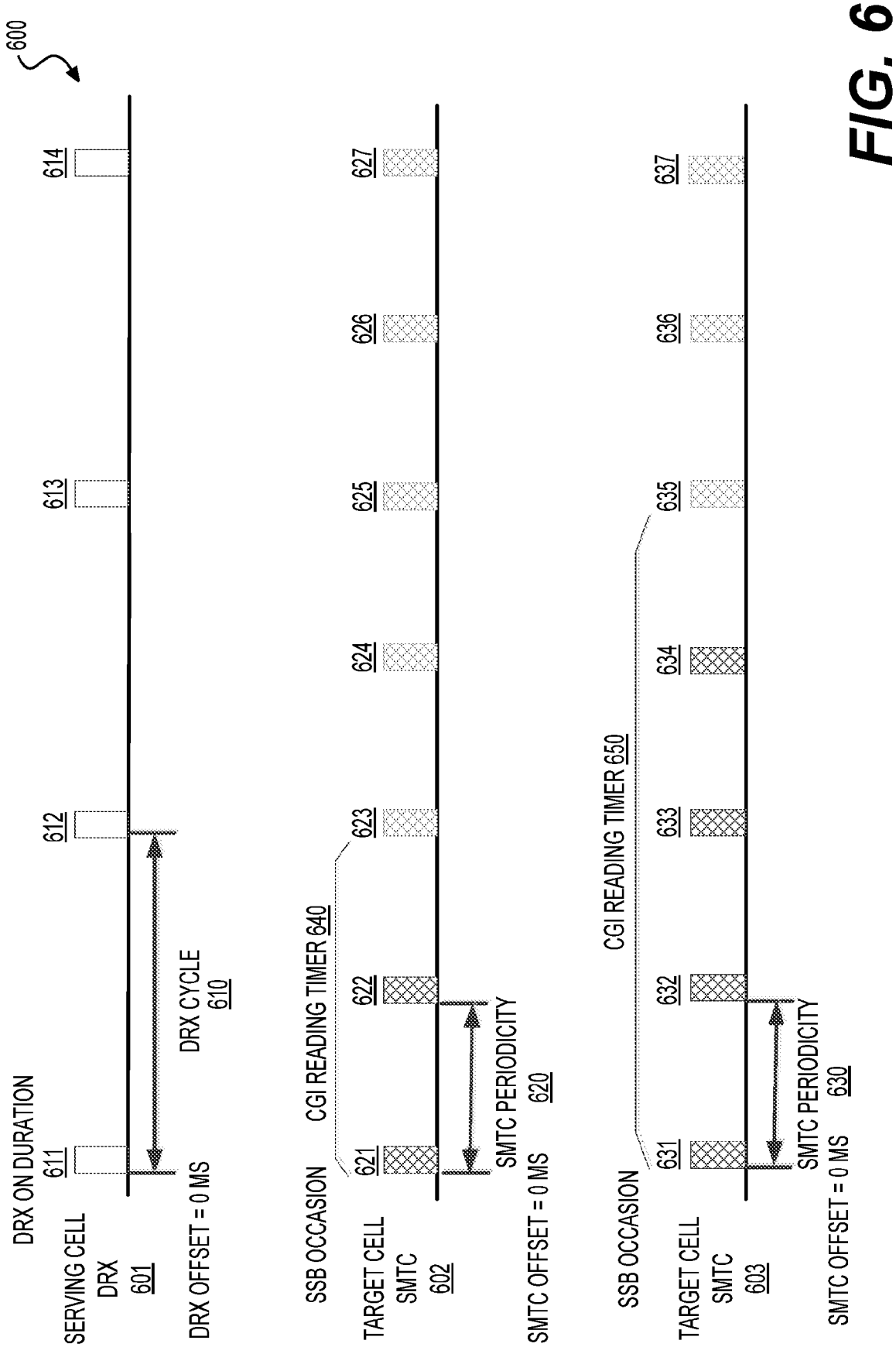
FIG. 6 shows an exemplary time diagram that illustrates a modified DRX configuration when the SSB (or RMSI) occasions of the target cell partially overlap with the DRX on durations of the serving cell according to an embodiment of the disclosure.

FIG. 6 is an exemplary time diagram 600 that illustrates a modified DRX configuration when the SSB (or RMSI) occasions of the target cell partially overlap with the DRX on durations of the serving cell according to an embodiment of the disclosure. In the FIG. 6 example, a CGI reading timer can be configured to extend the measurement time for CGI reading, which is equivalent to increase the numbers of available SSB occasions that are not overlapped with the DRX on durations, so that the UE can have enough time to decode the MIB information in the SSB occasions of the target cell during the DRX off durations of the serving cell. The value of the CGI reading timer can depend on frequency range (FR) information, DRX information, SMTC information, RMSI configuration information, and the overlap condition between the DRX on durations and the SSB/RMSI occasions. It should be understood that the CGI reading timer can also be applied in RMSI occasions to increase the numbers of available RMSI occasions that are not overlapped with the DRX on durations, so that the UE can have enough time to decode the SIB1 information in the RMSI occasions of the target cell during the DRX off durations of the serving cell.

In an embodiment, the DRX cycle of the serving cell 610 can be set to 40 ms and the SMTC periodicity of the target cell 620 can be set to 20 ms. The offset values of both the DRX cycles 601 of the serving cell and the SSB occasions (i.e., SMTC) 602 of the target cell can be set to 0 ms. As shown in the FIG. 6, the SSB occasions 621-627 are partially overlapped with the DRX on durations 611-614. In a time interval configured by the CGI reading timer 640, the UE cannot decode the MIB information in the SSB occasion 621 but can decode the MIB information in the SSB occasion 622. Further, the CGI reading timer 640 can be configured by doubling the time interval. Then the CGI reading timer 650 can to extend the measurement time for CGI reading. Specifically, The UE can decode the MIB information on SSB occasions 632 and 634, which is equivalent to double the number of available SSB occasions for MIB decoding.

Figure 7:
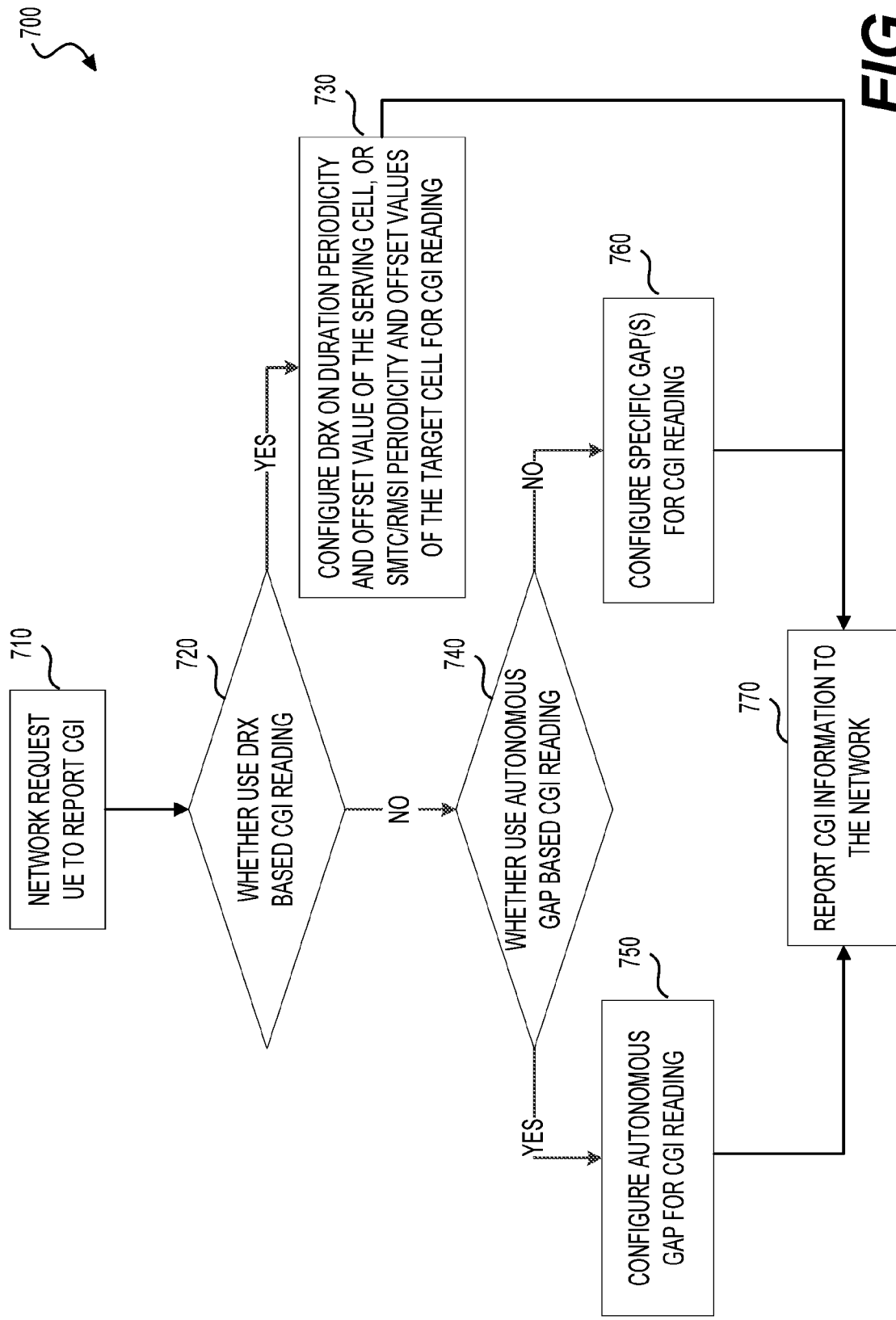
FIG. 7 is a flowchart that illustrates an exemplary process for CGI reading when the SSB (or RMSI) occasions of the target cell fully overlap with the DRX on durations of the serving cell according to an embodiment of the disclosure.

FIG. 7 is a flowchart that illustrates an exemplary process 700 for CGI reading when the SSB (or RMSI) occasions of the target cell fully overlap with the DRX on durations of the serving cell according to an embodiment of the disclosure. The process 700 can be performed at UE 110 and the BS 120. The 700 can start from the step 710.

At 710, the network (i.e., BS) can send a request message in a current cell to ask the UE to perform CGI reading of a target cell. For example, as shown in the FIG. 1, the UE 110 can receive a request message from the BS 120 in a serving cell 130 that asks the UE 110 to acquire CGI information of a specific target cell 141. The request message can include some command and control information, such as the signaling "reportCGI" message that includes elements {si-RequestForHO, gap periodicity, offset, and duration}. Specifically, the antenna 111 of the UE 110 can receive the wireless signals sent from the BS 120. Then the RF module 112 of the UE 110 can decode the received wireless signals to obtain the elements {si-RequestForHO, gap periodicity, offset, and duration} that are included in the "reportCGI" message. Then the process can proceed to 720.

At 720, the UE can first check the request message to decide whether to use the DRX based CGI reading to acquire the CGI information of the target cell. Specifically, the UE can check the decoded elements {si-RequestForHO, gap periodicity, offset, and duration} to decide whether the DRX based CGI reading can be performed. For example, as shown in the FIG. 1, the processing circuitry 113 of the UE 110 can execute the instructions stored in the memory 117 to check the values in the elements {si-RequestForHO, gap periodicity, offset, and duration}. When the value of the element "si-RequestForHO" is detected to be false (e.g., 0), the UE 110 can use the DRX based CGI reading to acquire the CGI information of the target cell 141. The process can then proceed to 730. Otherwise, the UE 110 can use autonomous gap based CGI reading when the value of the element "si-RequestForHO" is detected to be true (e.g., 1) or specific gap based CGI reading when the elements "gap periodicity, offset, and duration" have valid values. The process can then proceed to 740.

At 730, the UE can perform the DRX based CGI reading to acquire the CGI information of the target cell. In order to avoid the overlaps between the SSB (or RMSI) occasions of the target cell and the DRX on durations of the serving cell. The network can reconfigure the DRX on duration periodicity and the DRX offset value of the serving cell. The network can also reconfigure the SMTC periodicity, SMTC offset value, RMSI periodicity, and the RMSI offset value of the target cell. As shown in the FIG. 1, when the SSB (or RMSI) occasions of the target cell 141 fully overlap with the DRX on durations of the serving cell 130 and the UE 110 is notified by the BS 120 to use the DRX based CGI reading to acquire the CGI information of the target cell 141, e.g., the element "si-RequestForHO" is set to false (e.g., 0), the processing circuitry 113 of the UE 110 can trigger the DRX based CGI reading module 114 to execute the program instructions stored in the memory 117 based on the modified DRX on duration periodicity and the DRX offset value of the servicing cell 130, so that the modified DRX on durations can avoid the overlaps with the SSB and RMSI occasions of the target cell 141. For example, the DRX offset value can be set to 10 ms as shown in FIG. 3, so that the SSB (or RMSI) occasions 331-333 can avoid the overlaps with the modified DRX on durations 321-326. In the FIG. 4 example, the DRX on duration periodicity (e.g., DRX cycle) can also be changed from 20 ms to 64 ms, so that the SSB (or RMSI) occasions 431-433 can avoid overlaps with the modified DRX on durations 421-423. Alternatively, the DRX based CGI reading module 114 can also execute the program instructions stored in the memory 117 to modify the SMTC periodicity and the SMTC offset value of the target cell 141 to avoid the overlaps of the SSB occasions with the DRX on durations of the serving cell 130, or modify the RMSI periodicity and the RMSI offset value of the target cell 141 to avoid the overlaps of the RMSI occasions with the DRX on durations of the serving cell 130. Further, the DRX based CGI reading module 114 can execute the program instructions stored in the memory 117 to decode the MIB in the SSB occasions of the target cell 141 during the DRX off durations of the serving cell 130 and then decode the SIB1 in the RMSI occasions of the target cell 141 during the DRX off durations of the serving cell 130. Based on the decoded MIB and SIB1, the UE 110 can acquire the CGI information of the target cell 141. Then the process can proceed to 770.

At 740, the UE can further check the request message to decide whether to use the autonomous gap based CGI reading or the specific gap based CGI reading to acquire the CGI information of the target cell. Specifically, the UE can check the decoded elements {si-RequestForHO, gap periodicity, offset, and duration} to decide which kind of gap based CGI reading can be performed. For example, as shown in the FIG. 1, the processing circuitry 113 of the UE 110 can execute the instructions stored in the memory 117 to check the values in the elements {si-RequestForHO, gap periodicity, offset, and duration}. When the value of the element "si-RequestForHO" is detected to be true (e.g., 1), the UE 110 can use the autonomous gap based CGI reading. The process can then proceed to 750. When the elements "gap periodicity, offset, and duration" have valid values, the UE 110 can use the specific gap based CGI reading regardless of the element "si-RequestForHO". The process can then proceed to 760.

At 750, the UE can perform the autonomous gap based CGI reading to acquire the CGI information of the target cell. As shown in the FIG. 1, when the UE 110 is notified by the BS 120 to use the autonomous gap based CGI reading to acquire the CGI information of the target cell 141, e.g., the element "si-RequestForHO" is set to true (e.g., 1), the processing circuitry 113 of the UE 110 can trigger the autonomous gap based CGI reading module 115 to execute the program instructions stored in the memory 117 to create one or more measurement gaps in data reception and data transmission of the serving cell 130. Further, the autonomous gap based CGI reading module 115 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. The process can then proceed to 770.

At 760, the UE can perform the specific gap based CGI reading to acquire the CGI information of the target cell. As shown in the FIG. 1, when the UE 110 is notified by the BS 120 to use the specific gap based CGI reading to acquire the CGI information of the target cell 141, e.g., elements of "gap periodicity, offset, and duration" are set to valid values, the processing circuitry 113 of the UE 110 can trigger the specific gap based CGI reading module 116 to execute the program instructions stored in the memory 117 based on the configured one or more specific gaps to interrupt the data reception and data transmission in the DRX on durations of the serving cell 130. Herein, the specific gap can be generated by four different approaches.

In the first approach, the network node (e.g., BS 120) can configure a periodic gap to interrupt the UE's data reception and data transmission. The specific gap periodicity, offset value and duration could be configured with the report CGI signaling, such as the "reportCGI" message.

In the second approach, several bits can be configured to enumerate the possible multiple (N) of DRX cycles to indicate the specific gap periodicity and the offset value. For example, 2 bits can be configured to represent N=1, 2, 4, 8 multiple of DRX cycles. For the CGI reading start position, it could be explicitly indicated the rule, such as the first DRX on duration after receiving the CGI report request can be regarded as the start position of the CGI reading. 4 bits can be configured to represent specific gap periodicity and the offset value together. For example, '0000' means N=1; '0001' means N=2, Offset=0; '0010' means N=2, Offset=1; '0011' means N=4, Offset=0; '0100' means N=4, Offset=1; '0101' means N=4, Offset=2; '0110' means N=4, Offset=3; '0111' means N=8, Offset=0; '1000' means N=8, Offset=1; '1001' means N=8, Offset=2; '1010' means N=8, Offset=3; '1011' means N=8, Offset=4; '1100' means N=8, Offset=5; '1101' means N=8, Offset=6; '1110' means N=8, Offset=7; and '1111' means Reserved. Herein, the specific gap offset value is in the unit of DRX cycle.

In the third approach, the network node (e.g., BS 120) can configure a CGI reading offset value and a gap duration together with the report CGI signaling. The UE can finish the CGI reading procedure within the gap duration.

In the fourth approach, network can configure several bits to represent a gap sharing percentage between the DRX on durations and the SSB/RMSI occasions for the CGI reading. It can explicitly define a rule for the UE about how to select the SSB/RMSI occasions to decode the MIB and the SIB1 information. For example, the UE can start to decode the 1st overlapped SSB/RMSI occasion and periodically select the SSB/RMSI to decode the MIB and the SIB1 information. Another way is that the start position of CGI reading can be implicitly configured based on the gap sharing percentage.

Further, the specific gap based CGI reading module 116 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. The process can then proceed to 770.

At 770, the UE can report the acquired CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals.

During the CGI reading process 730, 750, and 760, the network (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

In an embodiment, the bitmap can be used to indicate the location of the RMSI in one Transmission Time Interval (TTI). For example, a bitmap "10000000" can indicate that the position of the RMSI is located in the first 20 ms in one TTI. Herein, the time duration of one TTI is set to 160 ms.

In another embodiment, the RMSI periodicity and the RMSI offset value can be provided to the UE to indicate the position of the RMSI in one TTI. For example, the RMSI periodicity can be set to 40 ms and the RMSI offset value can be set to 20 ms. Therefore, the RMSI position can be 20 ms, 60 ms, 100 ms, and 140 ms in one TTL whose tine duration is set to 160 ms.

In others embodiment, the UE can use a specific gap periodicity as the RMSI periodicity. For example, the specific gap periodicity can be obtained from the signaling "reportCGI" message, which includes the elements {si-RequestForHO, gap periodicity, offset, and duration}. In some examples, the network node (e.g., BS 120) can configure several bits to enumerate the possible multiple (N) of DRX cycles to indicate the RMSI periodicity and the RMSI offset value. For example, 2 bits can be configured to represent N=1, 2, 4, 8 multiple of DRX cycles. 4 bits can be configured to represent RMSI periodicity and the RMSI offset value together. For example, '0000' means N=1; '0001' means N=2, Offset=0; '0010' means N=2, Offset=1; '0011' means N=4, Offset=0; '0100' means N=4, Offset=1; '0101' means N=4, Offset=2; '0110' means N=4, Offset=3; '0111' means N=8, Offset=0; '1000' means N=8, Offset=1; '1001' means N=8, Offset=2; '1010' means N=8, Offset=3; '1011' means N=8, Offset=4; '1100' means N=8, Offset=5; '1101' means N=8, Offset=6; '1110' means N=8, Offset=7; and '1111' means Reserved. Herein, the RMSI offset value is in the unit of DRX cycle. In another example, the network node (e.g., BS 120) can configure several bits to represent a gap sharing percentage between the DRX on durations for CGI reading. It can define a rule for the UE to select the RMSI occasions to decode the SIB1 information. For example, the UE can start to decode the 1st overlapped RMSI occasion and periodically select the RMSI to decode the SIB1 information. Another way is that the start position of the RMSI can be configure based on the gap sharing percentage.

Figure 8:
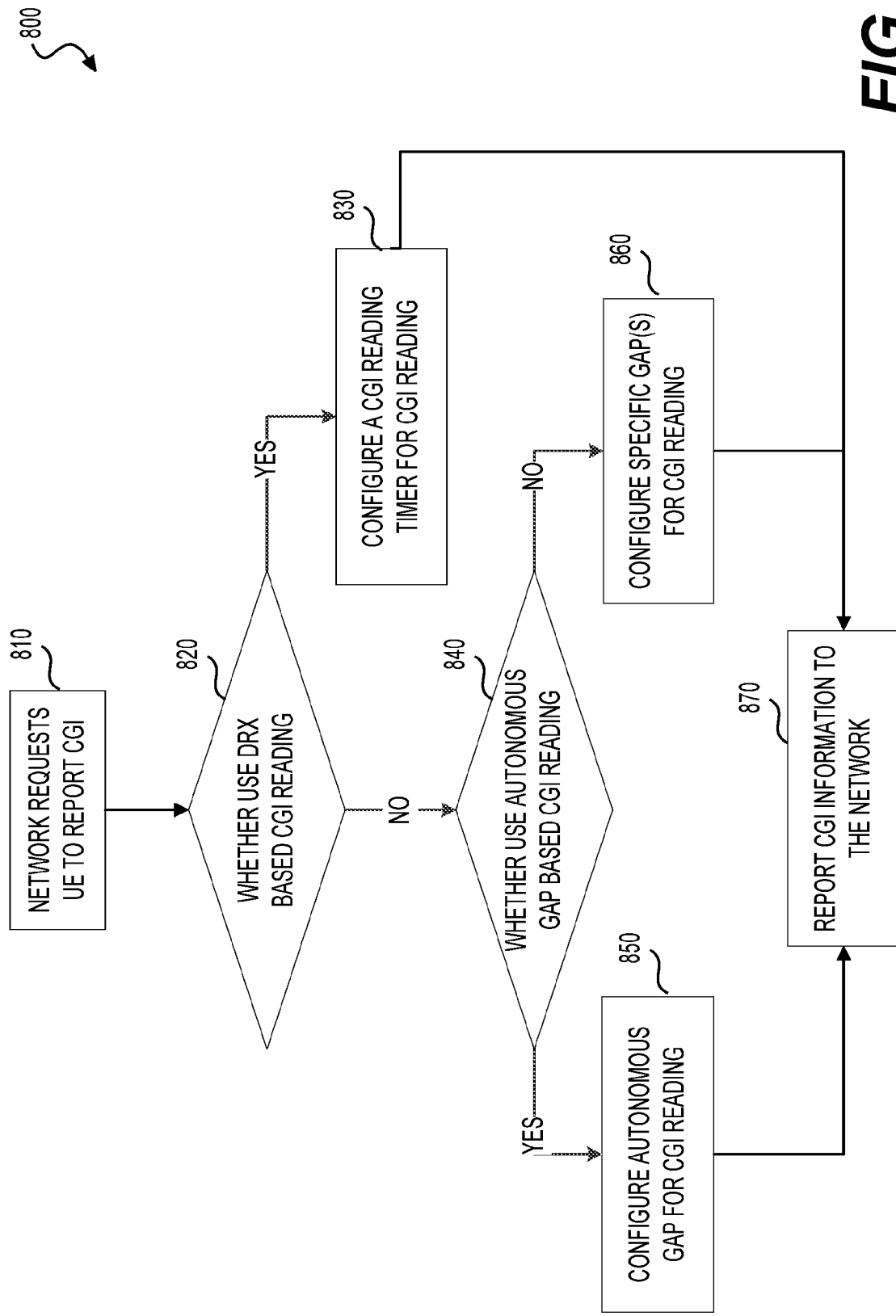
FIG. 8 is a flowchart that illustrates an exemplary process for CGI reading when the SSB (or RMSI) occasions of the target cell partially overlap with the DRX on durations of the serving cell according to an embodiment of the disclosure.

FIG. 8 is a flowchart that illustrates an exemplary process 800 for CGI reading when the SSB (or RMSI) occasions of the target cell partially overlap with the DRX on durations of the serving cell according to an embodiment of the disclosure. The process 800 can be performed at UE 110 and the BS 120. The 800 can start from the step 810.

At 810, the network (i.e., BS) can send a request message in a current cell to ask the UE to perform CGI reading of a target cell. For example, as shown in the FIG. 1, the UE 110 can receive a request message from the BS 120 in a serving cell 130 that asks the UE 110 to acquire CGI information of a specific target cell 141. The request message can include some command and control information, such as the signaling "reportCGI" message that includes elements {si-RequestForHO, gap periodicity, offset, and duration}. Specifically, the antenna 111 of the UE 110 can receive the wireless signals sent from the BS 120. Then the RF module 112 of the UE 110 can decode the received wireless signals to obtain the elements {si-RequestForHO, gap periodicity, offset, and duration} that are included in the "reportCGI" message. Then the process can proceed to 820.

At 820, the UE can first check the request message to decide whether to use the DRX based CGI reading to acquire the CGI information of the target cell. Specifically, the UE can check the decoded elements {si-RequestForHO, gap periodicity, offset, and duration} to decide whether the DRX based CGI reading can be performed. For example, as shown in the FIG. 1, the processing circuitry 113 of the UE 110 can execute the instructions stored in the memory 117 to check the values in the elements {si-RequestForHO, gap periodicity, offset, and duration}. When the value of the element "si-RequestForHO" is detected to be false (e.g., 0), the UE 110 can use the DRX based CGI reading to acquire the CGI information of the target cell 141. The process can then proceed to 830. Otherwise, the UE 110 can use autonomous gap based CGI reading when the value of the element "si-RequestForHO" is detected to be true (e.g., 1) or specific gap based CGI reading when the elements "gap periodicity, offset, and duration" have valid values. The process can then proceed to 840.

At 830, the UE can perform the DRX based CGI reading to acquire the CGI information of the target cell. Since the SSB (or RMSI) occasions of the target cell are partially overlapped with the DRX on durations of the serving cell, the available number of the SSB (or RMSI) occasions can be less than the number of the SSB (or RMSI) occasions in a non-overlap circumstance within a time interval. In order to extend the measurement duration for the UE to perform the MIB decoding and the RMSI decoding, the network node (e.g., BS 120) can configure a CGI reading timer with different timer values, e.g., {400, 800, 1600} ms. By applying the CGI reading timer in the DRX based CGI reading process, the UE can have an extended time for CGI reading, which is equivalent to increase the available number of SSB (or RMSI) occasions in a relaxed (extended) time interval. As shown in the FIG. 1, when the SSB (or RMSI) occasions of the target cell 141 partially overlap with the DRX on durations of the serving cell 130 and the UE 110 is notified by the BS 120 to use the DRX based CGI reading to acquire the CGI information of the target cell 141, e.g., the element "si-RequestForHO" is set to false (e.g., 0), the processing circuitry 113 of the UE 110 can trigger the DRX based CGI reading module 114 to execute the program instructions stored in the memory 117 based on the configured CGI reading timer, wherein the CGI reading timer information can depend on frequency range (FR), DRX configuration information, SMTC information, RMSI information, and the overlap situation between the DRX on durations and the SSB (or RMSI) occasions. The CGI reading timer can extend the measurement time for CGI reading, which is equivalent to increase the number of available SSB and RMSI occasions that are not overlapped with the DRX on durations, so that the UE 110 can have enough time to decode the MIB and SIB1 in the SSB and RMSI occasions during the DRX off durations of the serving cell 130, respectively. In the FIG. 6 example, before the CGI reading timer 640 doubles the time interval, the UE can use SSB occasion 622 for MIB decoding. When the CGI reading timer 650 extends the measurement time, the UE can use SSB occasions 632 and 634 for the MIB decoding. Further, the DRX based CGI reading module 114 can execute the program instructions stored in the memory 117 to decode the MIB in the SSB occasions of the target cell 141 during the DRX off durations of the serving cell 130 and then decode the SIB1 in the RMSI occasions of the target cell 141 during the DRX off durations of the serving cell 130. Based on the decoded MIB and SIB1, the UE 110 can acquire the CGI information of the target cell 141. Then the process can proceed to 870.

At 840, the UE can further check the request message to decide whether to use the autonomous gap based CGI reading or the specific gap based CGI reading to acquire the CGI information of the target cell. Specifically, the UE can check the decoded elements {si-RequestForHO, gap periodicity, offset, and duration} to decide which kind of gap based CGI reading can be performed. For example, as shown in the FIG. 1, the processing circuitry 113 of the UE 110 can execute the instructions stored in the memory 117 to check the values in the elements {si-RequestForHO, gap periodicity, offset, and duration}. When the value of the element "si-RequestForHO" is detected to be true (e.g., 1), the UE 110 can use the autonomous gap based CGI reading. The process can then proceed to 850. When the elements "gap periodicity, offset, and duration" have valid values, the UE 110 can use the specific gap based CGI reading regardless of the element "si-RequestForHO". The process can then proceed to 860.

At 850, the UE can perform the autonomous gap based CGI reading to acquire the CGI information of the target cell. As shown in the FIG. 1, when the UE 110 is notified by the BS 120 to use the autonomous gap based CGI reading to acquire the CGI information of the target cell 141, e.g., the element "si-RequestForHO" is set to true (e.g., 1), the processing circuitry 113 of the UE 110 can trigger the autonomous gap based CGI reading module 115 to execute the program instructions stored in the memory 117 to create one or more measurement gaps during the data reception and transmission in the serving cell 130. Further, the autonomous gap based CGI reading module 115 can execute the program instructions stored in the memory 117 to decode the MIB in the SSB occasions of the target cell 141 and then decode the SIB1 in the RMSI occasions of the target cell 141. Based on the decoded MIB and SIB1, the UE 110 can acquire the CGI information of the target cell 141. The process can then proceed to 870.

At 860, the UE can perform the specific gap based CGI reading to acquire the CGI information of the target cell. As shown in the FIG. 1, when the UE 110 is notified by the BS 120 to use the specific gap based CGI reading to acquire the CGI information of the target cell 141, e.g., elements of "gap periodicity, offset, and duration" are set to valid values, the processing circuitry 113 of the UE 110 can trigger the specific gap based CGI reading module 116 to execute the program instructions stored in the memory 117 based on the configured one or more specific gaps to interrupt the data reception and data transmission in the DRX on durations of the serving cell 130.

Further, the specific gap based CGI reading module 116 can execute the program instructions stored in the memory 117 to interrupt the data reception, the data transmission, or both the data reception and transmission in the DRX on durations of the serving cell 130, and then decode the MIB in the SSB occasions of the target cell 141 and the SIB1 in the RMSI occasions of the target cell 141. Based on the decoded MIB and SIB1, the UE 110 can acquire the CGI information of the target cell 141. The process can then proceed to 870.

At 870, the UE can report the acquired CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals.

During the CGI reading process 830, 850, and 860, the network (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

Figure 9:
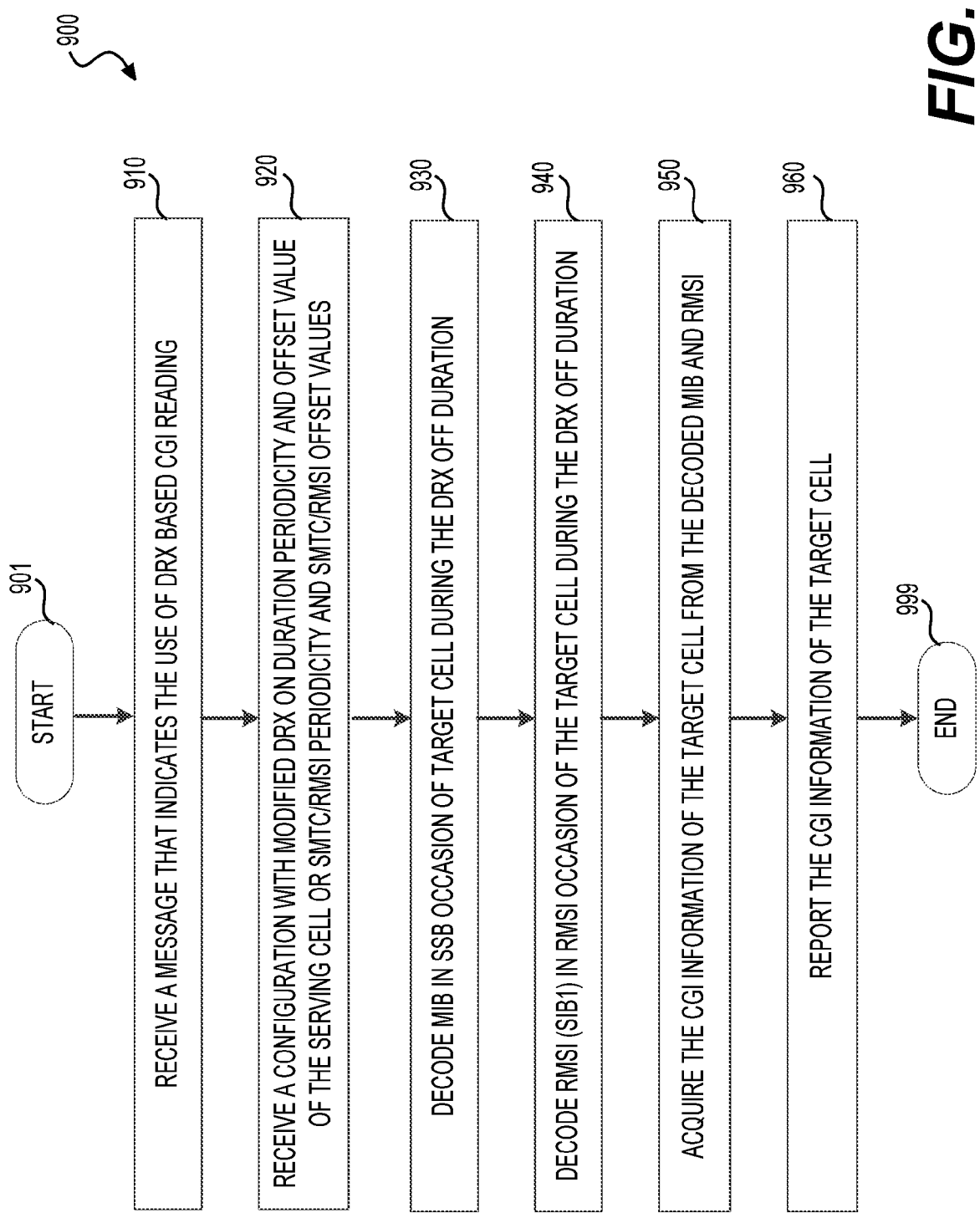
FIG. 9 is a flowchart showing an exemplary DRX based CGI reading process when the SSB (or RMSI) occasions of the target cell fully overlap with the DRX on durations of the serving cell according to an embodiment of the disclosure.

FIG. 9 is a flowchart showing an exemplary DRX based CGI reading process 900 when the SSB (or RMSI) occasions of the target cell fully overlap with the DRX on durations of the serving cell according to an embodiment of the disclosure. The process 900 can start from 901 and proceed to 910.

At 910, the UE can receive a message from the BS that indicates the use of the DRX based CGI reading. As shown in the FIG. 1, the UE 110 can receive a request message from the BS 120 in a serving cell 130 that asks the UE 110 to acquire the CGI information of the target cell 141. The request message can include some command and control information, such as the signaling "reportCGI" message that includes elements {si-RequestForHO, gap periodicity, offset, and duration}. The processing circuitry 113 of the UE 110 can execute the instructions stored in the memory 117 to check the values in the elements {si-RequestForHO, gap periodicity, offset, and duration}. When the value of the element "si-RequestForHO" is detected to be false (e.g., 0), the UE 110 can use the DRX based CGI reading to acquire the CGI information of the target cell 141. The process can then proceed to 920.

At 920, the UE can receive the modified DRX on duration periodicity and the DRX offset value of the serving cell, or the SMTC/RMSI periodicity and offset values of the target cell to avoid the overlaps. As shown in the FIG. 1, the processing circuitry 113 of the UE 110 can trigger the DRX based CGI reading module 114 to execute the program instructions stored in the memory 117 based on the modified DRX on duration periodicity and the DRX offset value of the servicing cell 130, so that the modified DRX on durations can avoid the overlaps with the SSB and RMSI occasions of the target cell 141. For example, the DRX offset value can be set to 10 ms as shown in FIG. 3, so that the SSB (or RMSI) occasions 331-333 can avoid the overlaps with the modified DRX on durations 321-326. In the FIG. 4 example, the DRX on duration periodicity (e.g., DRX cycle) can also be changed from 20 ms to 64 ms, so that the SSB (or RMSI) occasions 431-433 can avoid overlaps with the modified DRX on durations 421-423. Alternatively, the DRX based CGI reading module 114 can also execute the program instructions stored in the memory 117 based on the modified SMTC periodicity and the SMTC offset value of the target cell 141 to avoid the overlaps of the SSB occasions with the DRX on durations of the serving cell 130, or based on the modified RMSI periodicity and the RMSI offset value of the target cell 141 to avoid the overlaps of the RMSI occasions with the DRX on durations of the serving cell 130. Then the process can proceed to 930.

At 930, the UE can perform MIB decoding process to decode the MIB information in the SSB occasions of the target cell during the DRX off durations of the serving cell. For example, as shown in the FIG. 1, the DRX based CGI reading module 114 can execute the program instructions stored in the memory 117 to decode the MIB in the SSB occasions of the target cell 141 during the DRX off durations of the serving cell 130. Then the process can proceed to 940.

At 940, the UE can perform RMSI decoding process to decode the SIB1 information in the RMSI occasions of the target cell during the DRX off durations of the serving cell. For example, as shown in the FIG. 1, the DRX based CGI reading module 114 can execute the program instructions stored in the memory 117 to decode the SIB1 in the RMSI occasions of the target cell 141 during the DRX off durations of the serving cell 130. During the RMSI decoding process, the network (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

At 950, the UE can acquire the CGI information of the target cell based on the decoded MIB information and SIB1 information. For example, as shown in the FIG. 1, the DRX based CGI reading module 114 can execute the program instructions stored in the memory 117 to acquire the CGI information of the target cell 141 based on the decoded MIB information and SIB1 information. Then the process can proceed to 960.

At 960, the UE can report the CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals. Then the process can proceed to 999 and terminate.

Figure 10:
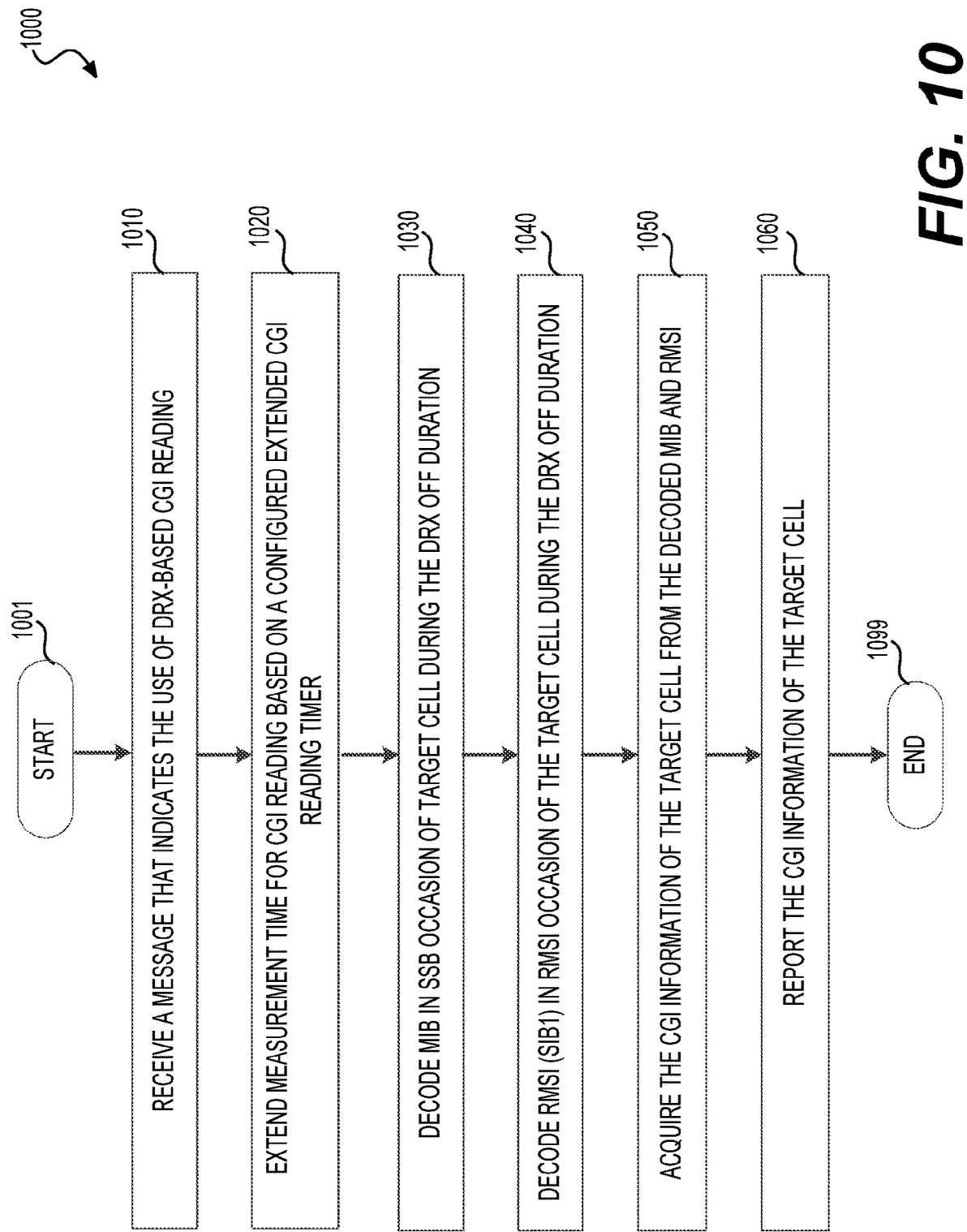
FIG. 10 is a flowchart showing an exemplary DRX based CGI reading process when the SSB (or RMSI) occasions of the target cell partially overlap with the DRX on durations of the serving cell according to an embodiment of the disclosure.

FIG. 10 is a flowchart showing an exemplary DRX based CGI reading process 1000 when the SSB (or RMSI) occasions of the target cell partially overlap with the DRX on durations of the serving cell according to an embodiment of the disclosure. The process 1000 can start from 1001 and proceed to 1010.

At 1010, the UE can receive a message from the BS that indicates the use of the DRX based CGI reading. As shown in the FIG. 1, the UE 110 can receive a request message from the BS 120 in a serving cell 130 that asks the UE 110 to acquire the CGI information of the target cell 141. The request message can include some command and control information, such as the signaling "reportCGI" message that includes elements {si-RequestForHO, gap periodicity, offset, and duration}. The processing circuitry 113 of the UE 110 can execute the instructions stored in the memory 117 to check the values in the elements {si-RequestForHO, gap periodicity, offset, and duration}. When the value of the element "si-RequestForHO" is detected to be false (e.g., 0), the UE 110 can use the DRX based CGI reading to acquire the CGI information of the target cell 141. The process can then proceed to 1020.

At 1020, the UE can extend the measurement time during the DRX based CGI reading process based on a configured extended CGI reading timer. Since the SSB (or RMSI) occasions of the target cell are partially overlapped with the DRX on durations of the serving cell, the available number of the SSB (or RMSI) occasions can be less than the number of the SSB (or RMSI) occasions in a non-overlap circumstance within a time interval. In order to extend the measurement time for the UE to perform the MIB decoding and the RMSI decoding, the network node (e.g., BS 120) can configure a CGI reading timer with different timer values, e.g., {400, 800, 1600} ms. By applying the CGI reading timer in the DRX based CGI reading process, the UE can have an extended time for CGI reading, which is equivalent to increase the available number of SSB (or RMSI) occasions in a relaxed (extended) time interval. As shown in the FIG. 1, the processing circuitry 113 of the UE 110 can trigger the DRX based CGI reading module 114 to execute the program instructions stored in the memory 117 based on the configured CGI reading timer, wherein the CGI reading timer information can depend on frequency range (FR), DRX configuration information, SMTC information, RMSI information, and the overlap situation between the DRX on durations and the SSB (or RMSI) occasions. The CGI reading timer can extend the measurement time for the CGI reading, which is equivalent to increase the number of available SSB and RMSI occasions that are not overlapped with the DRX on durations, so that the UE 110 can have enough time to decode the MIB and the SIB1 in the SSB and RMSI occasions during the DRX off durations of the serving cell 130, respectively. In the FIG. 6 example, before the CGI reading timer 640 doubles the time interval, the UE can use 622 for MIB decoding. When the CGI reading timer 650 extends the measurement time, the UE can use SSB occasions 632 and 634 for the MIB decoding. Then the process can proceed to 1030.

At 1030, the UE can perform MIB decoding process to decode the MIB information in the SSB occasions of the target cell during the DRX off durations of the serving cell. For example, as shown in the FIG. 1, the DRX based CGI reading module 114 can execute the program instructions stored in the memory 117 to decode the MIB in the SSB occasions of the target cell 141 during the DRX off durations of the serving cell 130. Then the process can proceed to 1040.

At 1040, the UE can perform RMSI decoding process to decode the SIB1 information in the RMSI occasions of the target cell during the DRX off durations of the serving cell. For example, as shown in the FIG. 1, the DRX based CGI reading module 114 can execute the program instructions stored in the memory 117 to decode the SIB1 in the RMSI occasions of the target cell 141 during the DRX off durations of the serving cell 130. During the RMSI decoding process, the network node (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

At 1050, the UE can acquire the CGI information of the target cell based on the decoded MIB information and SIB1 information. For example, as shown in the FIG. 1, the DRX based CGI reading module 114 can execute the program instructions stored in the memory 117 to acquire the CGI information of the target cell 141 based on the decoded MIB information and SIB1 information. Then the process can proceed to 1060.

At 1060, the UE can report the CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals. Then the process can proceed to 1099 and terminate.

Figure 11:
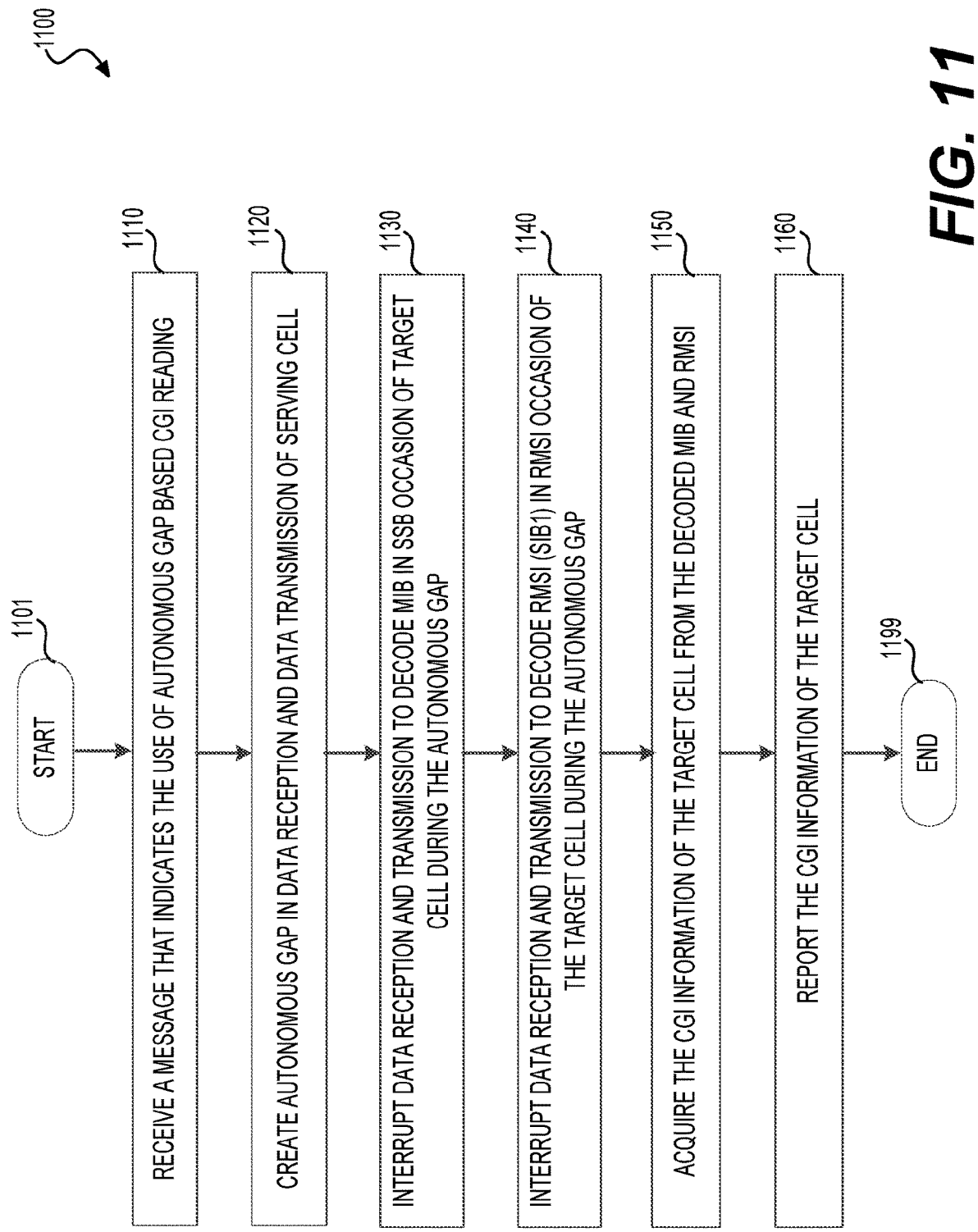
FIG. 11 is a flowchart showing an exemplary autonomous gap based CGI reading process according to an embodiment of the disclosure.

FIG. 11 is a flowchart showing an exemplary autonomous gap based CGI reading process 1100 according to an embodiment of the disclosure. The autonomous gap based CGI reading process 1100 can be applied when the SSB (or RMSI) occasions of the target cell fully overlap or partially overlap with the DRX on durations of the serving cell. The process 1100 can start from 1101 and proceed to 1110.

At 1110, the UE can receive a message from the BS that indicates the use of the autonomous gap based CGI reading. As shown in the FIG. 1, the UE 110 can receive a request message from the BS 120 in a serving cell 130 that asks the UE 110 to acquire the CGI information of the target cell 141. The request message can include some command and control information, such as the signaling "reportCGI" message that includes elements {si-RequestForHO, gap periodicity, offset, and duration}. The processing circuitry 113 of the UE 110 can execute the instructions stored in the memory 117 to check the values in the elements {si-RequestForHO, gap periodicity, offset, and duration}. When the value of the element "si-RequestForHO" is detected to be true (e.g., 1), the UE 110 can use the autonomous gap based CGI reading to acquire the CGI information of the target cell 141. The process can then proceed to 1120.

At 1120, the UE can create one or more autonomous gaps during the data reception and transmission in the serving cell. As shown in the FIG. 1, the processing circuitry 113 of the UE 110 can trigger the autonomous gap based CGI reading module 115 to execute the program instructions stored in the memory 117 to create one or more autonomous gaps in the serving cell 130. The autonomous gaps are measurement gaps created autonomously by the UE 110 in data transmission, in data reception, or both in the data reception and transmission in the DRX on durations of the serving cell 130. Then the process can proceed to 1130.

At 1130, the UE can perform MIB decoding process to decode the MIB information in the SSB occasions of the target cell during the DRX off durations of the serving cell. For example, as shown in the FIG. 1, the autonomous gap based CGI reading module 115 can execute the program instructions stored in the memory 117 to decode the MIB in the SSB occasions of the target cell 141 during the DRX off durations of the serving cell 130. Then the process can proceed to 1140.

At 1140, the UE can perform RMSI decoding process to decode the SIB1 information in the RMSI occasions of the target cell during the DRX off durations of the serving cell. For example, as shown in the FIG. 1, the autonomous gap based CGI reading module 115 can execute the program instructions stored in the memory 117 to decode the SIB1 in the RMSI occasions of the target cell 141 during the DRX off durations of the serving cell 130. During the RMSI decoding process, the network node (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

At 1150, the UE can acquire the CGI information of the target cell based on the decoded MIB information and SIB1 information. For example, as shown in the FIG. 1, the autonomous gap based CGI reading module 115 can execute the program instructions stored in the memory 117 to acquire the CGI information of the target cell 141 based on the decoded MIB information and SIB1 information. Then the process can proceed to 1160.

At 1160, the UE can report the CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals. Then the process can proceed to 1199 and terminate.

Figure 12:
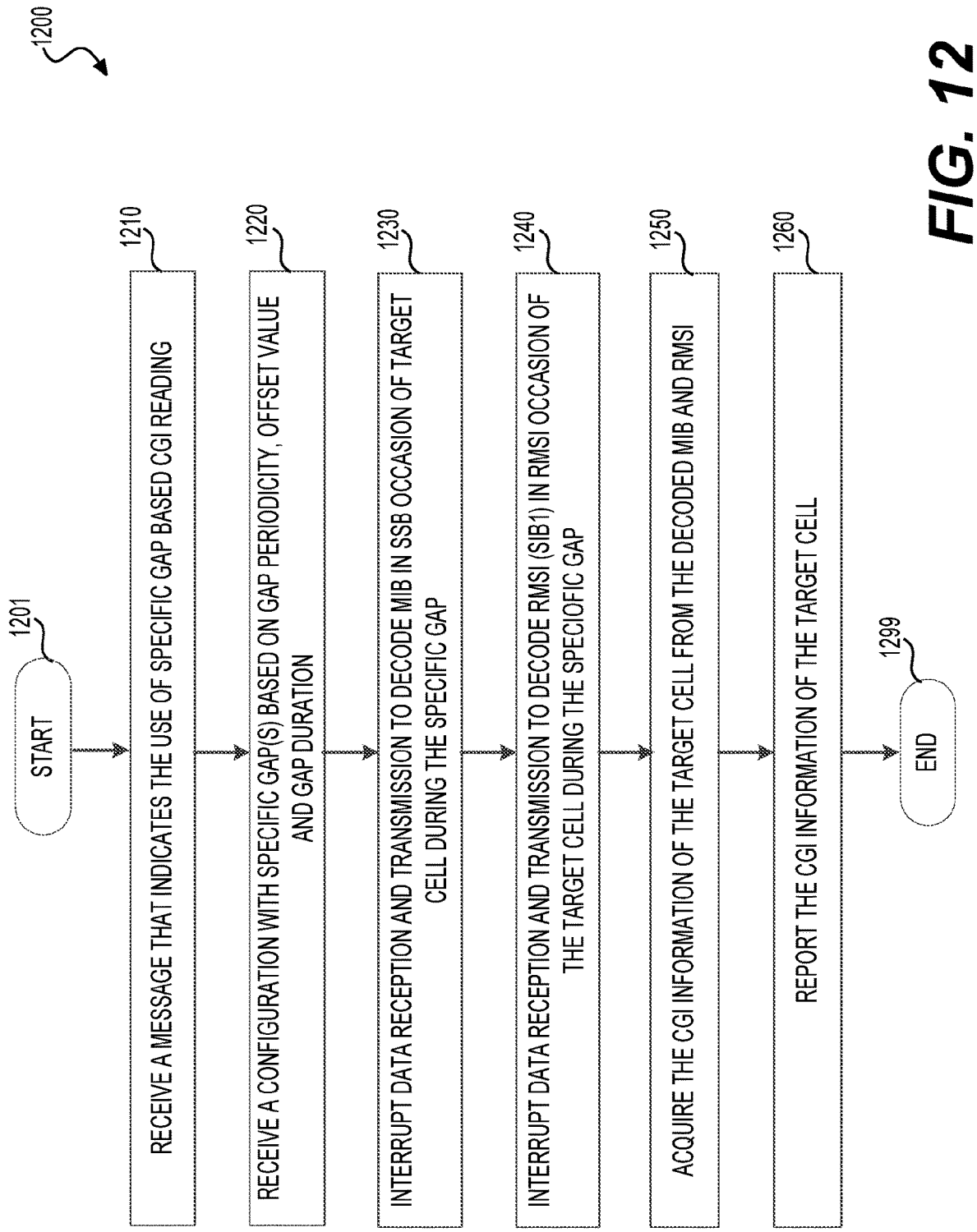
FIG. 12 is a flowchart showing an exemplary specific gap based CGI reading process according to an embodiment of the disclosure.

FIG. 12 is a flowchart showing an exemplary specific gap based CGI reading process 1200 according to an embodiment of the disclosure. The specific gap based CGI reading process 1200 can be applied when the SSB (or RMSI) occasions of the target cell fully overlap or partially overlap with the DRX on durations of the serving cell. The process 1200 can start from 1201 and proceed to 1210.

At 1210, the UE can receive a message from the BS that indicates the use of the specific gap based CGI reading. As shown in the FIG. 1, the UE 110 can receive a request message from the BS 120 in a serving cell 130 that asks the UE 110 to acquire the CGI information of the target cell 141. The request message can include some command and control information, such as the signaling "reportCGI" message that includes elements {si-RequestForHO, gap periodicity, offset, and duration}. The processing circuitry 113 of the UE 110 can execute the instructions stored in the memory 117 to check the values in the elements {si-RequestForHO, gap periodicity, offset, and duration}. When the elements "gap periodicity, offset, and duration" are detected to have valid values, the UE 110 can use the specific gap based CGI reading to acquire the CGI information of the target cell 141 regardless of the element "si-RequestForHO". The process can then proceed to 1220.

At 1220, the UE can receive a configuration with one or more specific gaps during the data reception and transmission in the serving cell. As shown in the FIG. 1, the processing circuitry 113 of the UE 110 can trigger the specific gap based CGI reading module 116 to execute the program instructions stored in the memory 117 based on configured one or more specific gaps to interrupt the data reception and the data transmission in the DRX on durations of the serving cell 130.

At 1230, the UE can perform MIB decoding process to decode the MIB information in the SSB occasions of the target cell while interrupting data reception and transmission in the DRX on durations of the serving cell. For example, as shown in the FIG. 1, the specific gap based CGI reading module 116 can execute the program instructions stored in the memory 117 to interrupt the data reception, the data transmission, or both the data reception and transmission in the DRX on durations of the serving cell 130, and then decode the MIB in the SSB occasions of the target cell 141. Then the process can proceed to 1240.

At 1240, the UE can perform RMSI decoding process to decode the SIB1 information in the RMSI occasions of the target cell while interrupting data reception and transmission in the DRX on durations of the serving cell. For example, as shown in the FIG. 1, the specific gap based CGI reading module 116 can execute the program instructions stored in the memory 117 to interrupt the data reception, the data transmission, or both the data reception and transmission in the DRX on durations of the serving cell 130, and then decode the SIB1 (RMSI) in the RMSI occasions of the target cell 141. During the RMSI decoding process, the network (e.g., BS 120) can further provide assistant information to the UE 110 for the RMSI decoding. The assistant information can be a "bitmap", a "RMSI periodicity and RMSI offset value", or any other possible information to help the UE 110 locate the position of the RMSI.

At 1250, the UE can acquire the CGI information of the target cell based on the decoded MIB information and SIB1 information. For example, as shown in the FIG. 1, the specific gap based CGI reading module 116 can execute the program instructions stored in the memory 117 to acquire the CGI information of the target cell 141 based on the decoded MIB information and SIB1 information. Then the process can proceed to 1260.

At 1260, the UE can report the CGI information of the target cell to the BS. For example, as shown in the FIG. 1, the processing circuitry 113 of the UE 110 can execute the program instructions stored in the memory 117 to report the CGI information to the BS 120. Specifically, the RF module 112 can convert the acquired CGI information into analog signals and transmit the analog signals via the antenna 111 as wireless signals. Then the process can proceed to 1299 and terminate.

Figure 13:
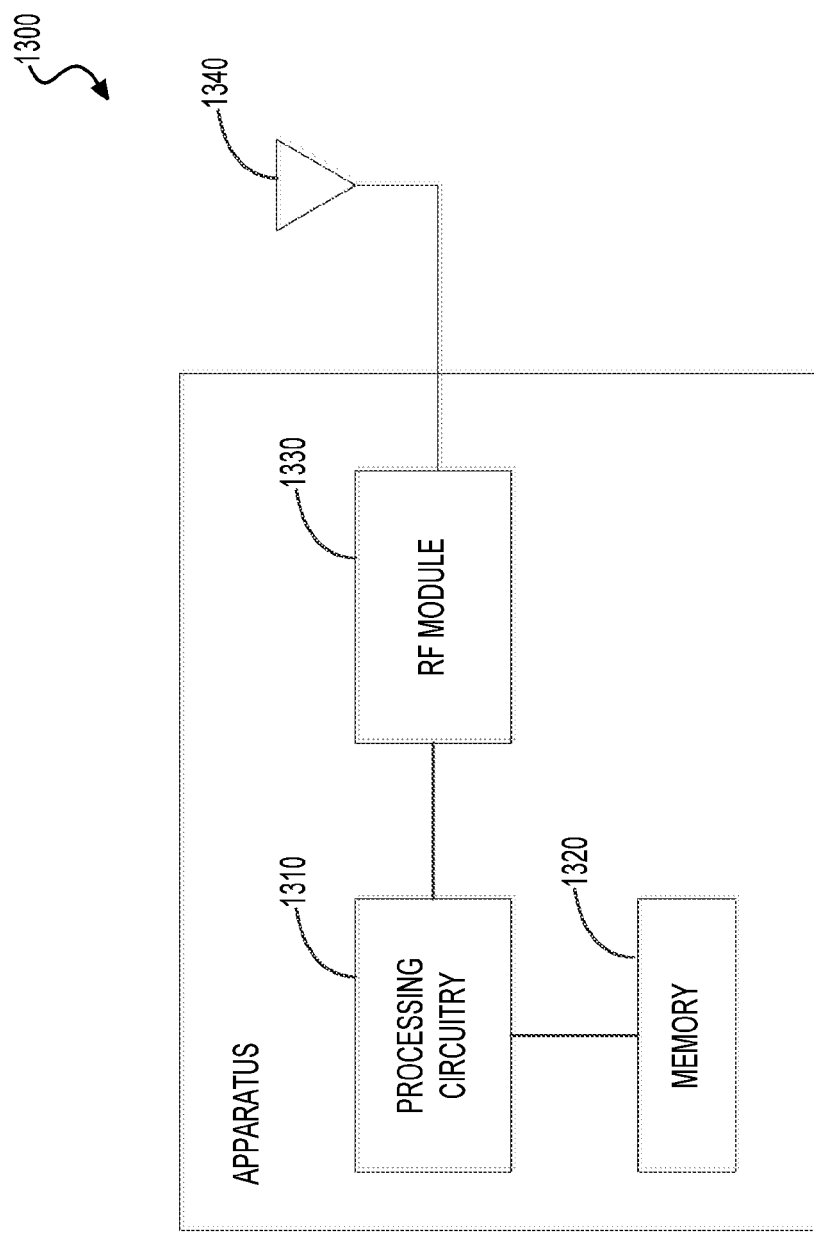
FIG. 13 shows an exemplary block diagram of a UE according to an embodiment of the disclosure.

FIG. 13 shows an exemplary apparatus 1300 according to embodiments of the disclosure. The apparatus 1300 can be configured to perform various functions in accordance with one or more embodiments or examples described herein. Thus, the apparatus 1300 can provide means for implementation of techniques, processes, functions, components, systems described herein. For example, the apparatus 1300 can be used to implement functions of the UE 110 in various embodiments and examples described herein. The apparatus 1300 can be a general purpose computer in some embodiments, and can be a device including specially designed circuits to implement various functions, components, or processes described herein in other embodiments. The apparatus 1300 can include processing circuitry 1310, a memory 1320, a radio frequency (RF) module 1330, and an antenna 1340.

In various examples, the processing circuitry 1310 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1310 can be a central processing unit (CPU) configured to execute program instructions to perform various functions and processes described herein. Accordingly, the memory 1320 can be configured to store program instructions. The processing circuitry 1310, when executing the program instructions, can perform the functions and processes. The memory 1320 can further store other programs or data, such as operating systems, application programs, and the like. The memory can include transitory or non-transitory storage medium. The memory 1320 can include a read only memory (ROM), a random access memory (RAM), a flash memory, a solid state memory, a hard disk drive, an optical disk drive, and the like.

The RF module 1330 receives processed data signal from the processing circuitry 1310 and transmits the signal in a beam-formed wireless communication network via an antenna 1340, or vice versa. The RF module 1330 can include a digital to analog convertor (DAC), an analog to digital converter (ADC), a frequency up convertor, a frequency down converter, filters, and amplifiers for reception and transmission operations. The RF module 1330 can include multi-antenna circuitry (e.g., analog signal phase/amplitude control units) for beamforming operations. The antenna 1340 can include one or more antenna arrays.

The apparatus 1300 can optionally include other components, such as input and output devices, additional or signal processing circuitry, and the like. Accordingly, the apparatus 1300 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method for cell global identifier reading, comprising:
   receiving a request over a serving cell to report Cell Global Identifier (CGI) information of a target cell to a network node;
   decoding system information to acquire the CGI information of the target cell by:
   using Synchronization Signal Block (SSB) and Remaining Minimum System Information (RMSI) occasions in Discontinuous Reception (DRX) off duration of the serving cell;
   using at least one autonomous gap to interrupt data reception and transmission of the serving cell; or
   using at least one specific gap to interrupt data reception and transmission of the serving cell; and transmitting the CGI information of the target cell to the network node.

2. The method of claim 1, wherein decoding the system information to acquire the CGI information of the target cell when the SSB and RMSI occasions of the target cell fully overlap with the DRX on durations of the serving cell, further comprises:
- receiving a message that indicates the use of the DRX based CGI reading;
- receiving at least one of the:
  - modified DRX on duration periodicity and DRX offset values of the serving cell to avoid the overlaps with the SSB and RMSI occasions of the target cell, or
  - modified SSB based RRM Measurement Timing Configuration (SMTC) periodicity, SMTC offset value, RMSI periodicity and RMSI offset value of the target cell to avoid the overlaps with the DRX on durations of the serving cell;
- decoding Master Information Block (MIB) and the RMSI in the modified SSB and RMSI occasions of the target cell during the modified DRX off durations of the serving cell; and
- acquiring the CGI information of the target cell from the decoded MIB and the RMSI.

3. The method of claim 1, wherein decoding the system information to acquire the CGI information of the target cell when the SSB and RMSI occasions of the target cell partially overlap with the DRX on durations of the serving cell, further comprises:
- receiving a message that indicates the use of the DRX based CGI reading;
- configuring by a CGI reading timer based on frequency range (FR) information, DRX information, SSB based RRM Measurement Timing Configuration (SMTC) information, RMSI configuration information, and the overlap condition between the DRX on durations and the SSB and RMSI occasions;
- decoding Master Information Block (MIB) and the RMSI in the SSB and RMSI occasions of the target cell during the modified DRX off durations of the serving cell until the CGI reading timer expires; and
- acquiring the CGI information of the target cell from the decoded MIB and the RMSI.

4. The method of claim 1, wherein decoding the system information to acquire the CGI information of the target cell by using at least one autonomous gap in data reception and transmission of the serving cell, further comprises:
- receiving a message that indicates the use of the autonomous gap based CGI reading;
- creating the autonomous gap in at least one of data reception and data transmission of the serving cell;
- interrupting at least one of data reception and data transmission of the serving cell by the created autonomous gap;
- decoding Master Information Block (MIB) and the RMSI in the SSB and RMSI occasions of the target cell during the created autonomous gap; and
- acquiring the CGI information of the target cell from the decoded MIB and the RMSI.

5. The method of claim 1, wherein decoding the system information to acquire the CGI information of the target cell by using at least one specific gap to interrupt data reception and transmission of the serving cell, further comprises:
- receiving a message that indicates the use of the specific gap based CGI reading;
- receiving the specific gap configuration based on the gap periodicity, offset value, and gap duration of the specific gap;
- interrupting at least one of data reception and data transmission during the DRX on duration of the serving cell by the created specific gap;
- decoding the Master Information Block (MIB) and the RMSI during the created specific gap; and
- acquiring the CGI information of the target cell from the decoded MIB and the RMSI.

6. The method of claim 5, wherein creating the specific gap based on the gap periodicity, offset value, and gap duration of the specific gap, further comprises one of:
- creating the specific gap periodicity, offset value, and duration;
- generating a bitmap that includes a plurality of bits to indicate the number of DRX cycles for the specific gap periodicity and offset value for the CGI reading starting position;
- setting a CGI reading start offset and a gap duration; and
- configuring a gap sharing percentage between the DRX on durations and the SSB and RMSI occasions for the CGI reading.

7. The method of claim 1, wherein decoding the system information to acquire the CGI information of the target cell, further comprises providing assistant information for decoding the RMSI by:
- generating a bitmap to indicate the RMSI position in one Transmission Time Interval (TTI);
- creating a periodicity and a offset value to indicate the RMSI position in one TTI;
- using the specific gap periodicity, offset value, and duration for the RMSI position;
- generating a bitmap that includes a plurality of bits to indicate the number of DRX cycles for the RMSI periodicity and RMSI offset value for the RMSI starting position; or
- configuring a gap sharing percentage between the DRX on durations and the RMSI occasions for the RMSI decoding.

8. An apparatus, comprising processing circuitry configured to:
- receive a request over a serving cell to report Cell Global Identifier (CGI) information of a target cell to a network node;
- decode system information to acquire the CGI information of the target cell by:
  - using Synchronization Signal Block (SSB) and Remaining Minimum System Information (RMSI) occasions in Discontinuous Reception (DRX) off duration of the serving cell;
  - using at least one autonomous gap to interrupt data reception and transmission of the serving cell; or
  - using at least one specific gap to interrupt data reception and transmission of the serving cell; and
- transmit the CGI information of the target cell to the network node.

9. The apparatus of claim 8, wherein decoding the system information to acquire the CGI information of the target cell when the SSB and RMSI occasions of the target cell fully overlap with the DRX on duration of the serving cell, further includes:
- receiving a message that indicates the use of the DRX based CGI reading;

receiving at least one of the:
  modified DRX on duration periodicity and DRX offset values of the serving cell to avoid the overlaps with the SSB and RMSI occasions of the target cell, or
  modified SSB based RRM Measurement Timing Configuration (SMTC) periodicity, SMTC offset value, RMSI periodicity and RMSI offset value of the target cell to avoid the overlaps with the DRX on durations of the serving cell;
  decoding Master Information Block (MIB) and the RMSI in the modified SSB and RMSI occasions of the target cell during the modified DRX off durations of the serving cell; and
  acquiring the CGI information of the target cell from the decoded MIB and the RMSI.

10. The apparatus of claim 8, wherein decoding the system information to acquire the CGI information of the target cell when the SSB and RMSI occasions of the target cell partially overlap with the DRX on durations of the serving cell, further includes:
  receiving a message that indicates the use of the DRX based CGI reading;
  configuring by a CGI reading timer based on frequency range (FR) information, DRX information, SSB based RRM Measurement Timing Configuration (SMTC) information, RMSI configuration information, and the overlap condition between the DRX on durations and the SSB and RMSI occasions;
  decoding Master Information Block (MIB) and the RMSI in the SSB and RMSI occasions of the target cell during the modified DRX off durations of the serving cell until the CGI reading timer expires; and
  acquiring the CGI information of the target cell from the decoded MIB and the RMSI.

11. The apparatus of claim 8, wherein decoding the system information to acquire the CGI information of the target cell by using at least one autonomous gap in data reception and transmission of the serving cell, further includes:
  receiving a message that indicates the use of the autonomous gap based CGI reading;
  creating the autonomous gap in at least one of data reception and data transmission of the serving cell;
  interrupting at least one of data reception and data transmission of the serving cell by the created autonomous gap;
  decoding Master Information Block (MIB) and the RMSI in the SSB and RMSI occasions of the target cell during the created autonomous gap; and
  acquiring the CGI information of the target cell from the decoded MIB and the RMSI.

12. The apparatus of claim 8, wherein decoding the system information to acquire the CGI information of the target cell by using at least one specific gap to interrupt data reception and transmission of the serving cell, further includes:
  receiving a message that indicates the use of the specific gap based CGI reading;
  receiving the specific gap configuration based on the gap periodicity, offset value, and gap duration of the specific gap;
  interrupting at least one of data reception and data transmission of the serving cell by the created specific gap;
  decoding the Master Information Block (MIB) and the RMSI during the created specific gap; and
  acquiring the CGI information of the target cell from the decoded MIB and the RMSI.

13. The apparatus of claim 12, wherein creating the specific gap based on the gap periodicity, offset value, and gap duration of the specific gap, further includes one of:
  creating the specific gap periodicity, offset value, and duration;
  generating a bitmap that includes a plurality of bits to indicate the number of DRX cycles for the specific gap periodicity and offset value for the CGI reading starting position;
  setting a CGI reading start offset and a gap duration; and
  configuring a gap sharing percentage between the DRX on durations and the SSB and RMSI occasions for the CGI reading.

14. The apparatus of claim 8, wherein decoding the system information to acquire the CGI information of the target cell, further includes providing assistant information for decoding the RMSI by:
  generating a bitmap to indicate the RMSI position in one Transmission Time Interval (TTI);
  creating a periodicity and a offset value to indicate the RMSI position in one TTI;
  using the specific gap periodicity, offset value, and duration for the RMSI position;
  generating a bitmap that includes a plurality of bits to indicate the number of DRX cycles for the RMSI periodicity and RMSI offset value for the RMSI starting position; or
  configuring a gap sharing percentage between the DRX on durations and the RMSI occasions for the RMSI decoding.

15. A non-transitory computer readable medium storing instructions which, when executed by a processor, cause the processor to perform the steps of:
  receiving a request over a serving cell to report Cell Global Identifier (CGI) information of a target cell to a network node;
  decoding system information to acquire the CGI information of the target cell by:
    using Synchronization Signal Block (SSB) and Remaining Minimum System Information (RMSI) occasions in Discontinuous Reception (DRX) off durations of the serving cell;
    using at least one autonomous gap to interrupt data reception and transmission of the serving cell; or
    using at least one specific gap to interrupt data reception and transmission of the serving cell; and
  transmitting the CGI information of the target cell to the network node.

16. The non-transitory computer readable medium of claim 15, wherein the instructions being executed by the processor to decode the system information to acquire the CGI information of the target cell when the SSB and RMSI occasions of the target cell fully overlap with the DRX on durations of the serving cell, further cause the processor to perform the steps of:
  receiving a message that indicates the use of the DRX based CGI reading;
  receiving at least one of the:
    modified DRX on duration periodicity and DRX offset values of the serving cell to avoid the overlaps with the SSB and RMSI occasions of the target cell, or
    modified SSB based RRM Measurement Timing Configuration information (SMTC) periodicity, SMTC offset value, RMSI periodicity, and RMSI offset value of the target cell to avoid the overlaps with the DRX on durations of the serving cell;

decoding Master Information Block (MIB) and the RMSI in the modified SSB and RMSI occasions of the target cell during the modified DRX off durations of the serving cell; and acquiring the CGI information of the target cell from the decoded MIB and the RMSI.

17. The non-transitory computer readable medium of claim 15, wherein the instructions being executed by the processor to decode the system information to acquire the CGI information of the target cell when the SSB and RMSI occasions of the target cell partially overlap with the DRX on durations of the serving cell, further cause the processor to perform the steps of:

receiving a message that indicates the use of the DRX based CGI reading;

configuring by a CGI reading timer based on frequency range (FR) information, DRX information, SSB based RRM Measurement Timing Configuration (SMTC) information, RMSI configuration information, and the overlap condition between the DRX on durations and the SSB and RMSI occasions;

decoding Master Information Block (MIB) and the RMSI in the SSB and RMSI occasions of the target cell during the modified DRX off durations of the serving cell until the CGI reading timer expires; and acquiring the CGI information of the target cell from the decoded MIB and the RMSI.

18. The non-transitory computer readable medium of claim 15, wherein the instructions being executed by the processor to decode the system information to acquire the CGI information of the target cell by using at least one autonomous gap in data reception and transmission of the serving cell, further cause the processor to perform the steps of:

receiving a message that indicates the use of the autonomous gap based CGI reading;

creating the autonomous gap in at least one of data reception and data transmission of the serving cell;

interrupting at least one of data reception and data transmission of the serving cell by the created autonomous gap;

decoding Master Information Block (MIB) and the RMSI in the SSB and RMSI occasions of the target cell during the created autonomous gap; and acquiring the CGI information of the target cell from the decoded MIB and the RMSI.

19. The non-transitory computer readable medium of claim 15, wherein the instructions being executed by the processor to decode the system information to acquire the CGI information of the target cell by using at least one specific gap to interrupt data reception and transmission of the serving cell, further cause the processor to perform the steps of:

receiving a message that indicates the use of the specific gap based CGI reading;

receiving the specific gap configuration based on the gap periodicity, offset value, and gap duration of the specific gap;

interrupting at least one of data reception and data transmission of the serving cell by the created specific gap;

decoding the Master Information Block (MIB) and the RMSI during the created specific gap; and acquiring the CGI information of the target cell from the decoded MIB and the RMSI.

20. The non-transitory computer readable medium of claim 19, wherein the instructions being executed by the processor to create the specific gap based on the gap periodicity, offset value, and gap duration of the specific gap, further cause the processor to perform one of:

creating the specific gap periodicity, offset value, and duration;

generating a bitmap that includes a plurality of bits to indicate the number of DRX cycles for the specific gap periodicity and offset value for the CGI reading starting position;

setting a CGI reading start offset and a gap duration; and configuring a gap sharing percentage between the DRX on durations and the SSB and RMSI occasions for the CGI reading.

* * * * *